United States Patent
Mizuno et al.

(10) Patent No.: US 9,777,343 B2
(45) Date of Patent: Oct. 3, 2017

(54) STEEL FOR SURFACE HARDENING FOR MACHINE STRUCTURAL USE AND PART FOR MACHINE STRUCTURAL USE

(71) Applicant: Nippon Steel & Sumitomo Metal Corporation, Tokyo (JP)

(72) Inventors: Atsushi Mizuno, Tokyo (JP); Masayuki Hashimura, Tokyo (JP); Kei Miyanishi, Tokyo (JP); Shuji Kozawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 336 days.

(21) Appl. No.: 14/252,093

(22) Filed: Apr. 14, 2014

(65) Prior Publication Data

US 2014/0251507 A1    Sep. 11, 2014

(30) Foreign Application Priority Data

Jan. 16, 2009    (JP) ................. 2009-007756

(51) Int. Cl.
| | |
|---|---|
| *C22C 38/06* | (2006.01) |
| *C22C 38/04* | (2006.01) |
| *C22C 38/02* | (2006.01) |
| *C21D 1/10* | (2006.01) |
| *C23C 8/26* | (2006.01) |
| *C23C 8/50* | (2006.01) |

(52) U.S. Cl.
CPC .................. *C21D 1/10* (2013.01); *C23C 8/26* (2013.01); *C23C 8/50* (2013.01)

(58) Field of Classification Search
None
See application file for complete search history.

(56) References Cited

U.S. PATENT DOCUMENTS

2010/0139811 A1    6/2010 Kozawa et al.

FOREIGN PATENT DOCUMENTS

| JP | 06-172961 | 6/1994 | | |
|---|---|---|---|---|
| JP | 07-090363 | 4/1995 | | |
| JP | 07-090364 | 4/1995 | | |
| JP | 10-259421 | 9/1998 | | |
| JP | 11-029836 | 2/1999 | | |
| JP | EP 1167561 | * | 2/2002 | ............ C22C 38/00 |
| JP | 2005139485 | 6/2005 | | |

(Continued)

OTHER PUBLICATIONS

CodeCOGS, Impurities in Steel (2009).*

(Continued)

*Primary Examiner* — Yoshitoshi Takeuchi
(74) *Attorney, Agent, or Firm* — Birch, Stewart, Kolasch & Birch, LLP

(57) ABSTRACT

The present invention is steel for surface hardening for machine structural use which contains, by mass %, C: 0.3 to 0.6%, Si: 0.02 to 2.0%, Mn: 0.35 to less than 1.5%, and Al: 0.01 to 0.5%, is restricted to B: less than 0.0003%, S: 0.0001 to 0.021%, N: 0.003 to 0.0055%, P: 0.0001 to 0.03%, and O: 0.0001 to 0.0050%, has a ratio Mn/S of Mn and S satisfying 70 to 30,000, has a balance of Fe and unavoidable impurities, and, when nitrided, then induction hardened, has a surface hardenability of a Vicker's hardness when tempered at 300° C. of 650 or more.

1 Claim, 4 Drawing Sheets

(56) References Cited

FOREIGN PATENT DOCUMENTS

| JP | 2007-077411 | * | 3/2007 | ............... C21D 1/06 |
|----|-------------|---|--------|---------------------------|
| JP | 2007-77411  |   | 3/2007 | |
| JP | 2007-177317 |   | 7/2007 | |
| JP | 2008-169485 |   | 7/2008 | |
| JP | 2008169485  |   | 7/2008 | |
| WO | 2007086215  |   | 2/2007 | |
| WO | WO 2009/054530 | | 4/2009 | |

OTHER PUBLICATIONS

International Search Report dated Apr. 27, 2010 issued in corresponding PCT Application No. PCT/JP2010/050742.
"Metallurgy—Impurities in Steel", 2009, www.codecogs.com.
EP Search Report issued in corresponding EP Application No. 10731349.6, dated Jun. 1, 2015.

* cited by examiner

Fig. 2
Fig. 2A
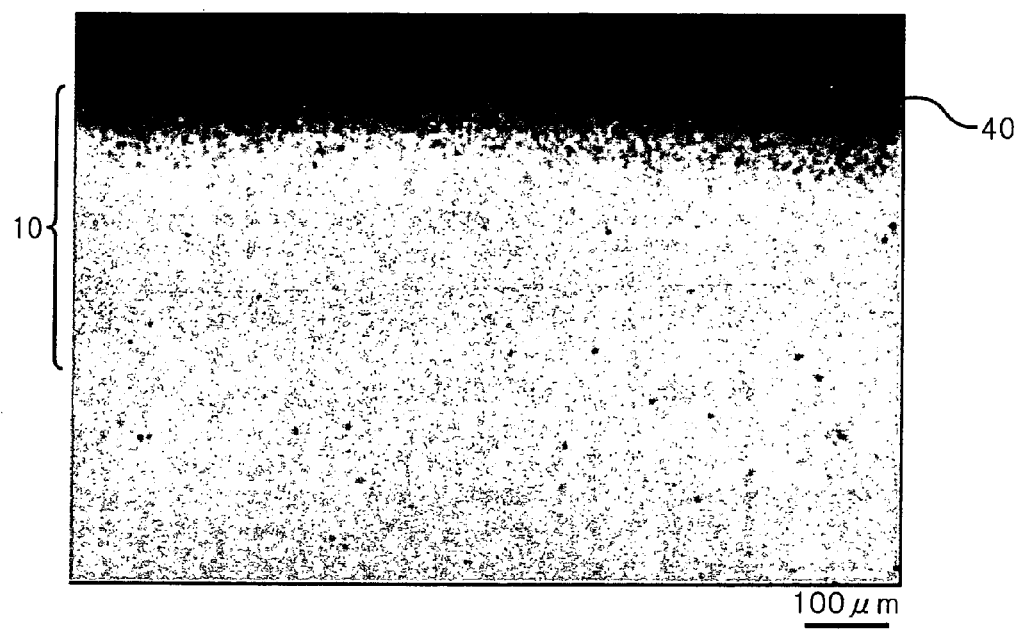
Fig. 2B
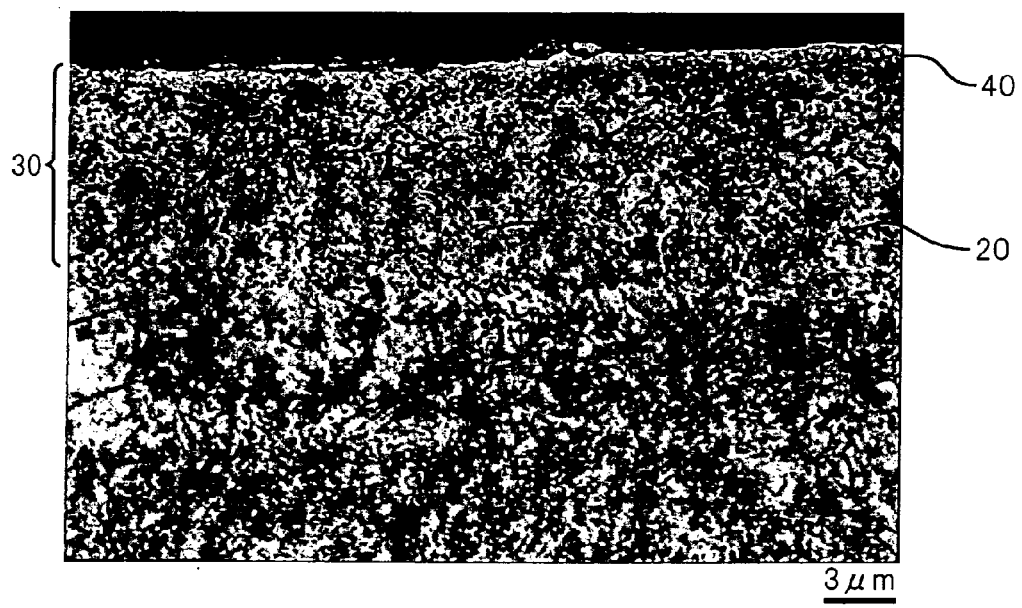

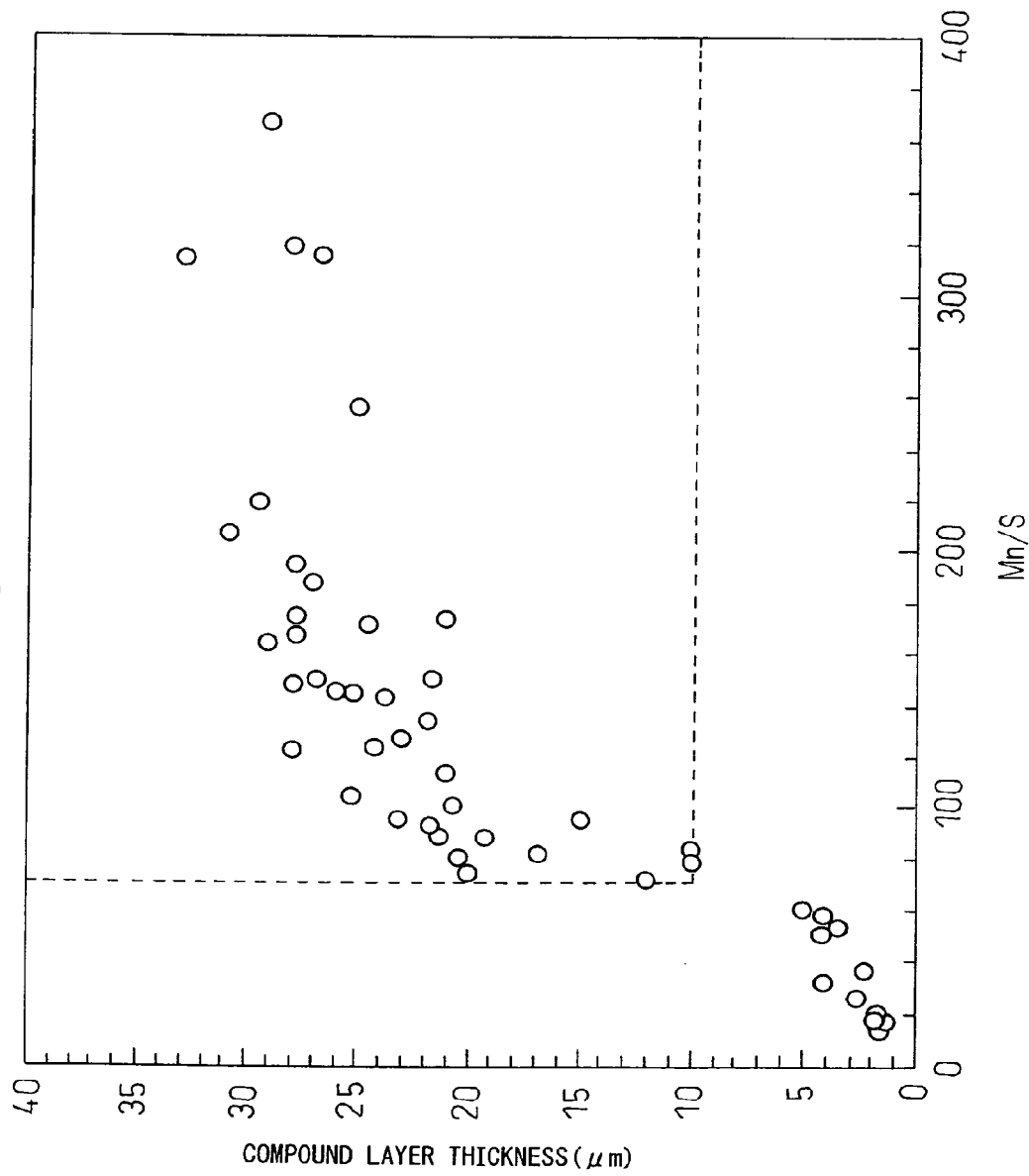

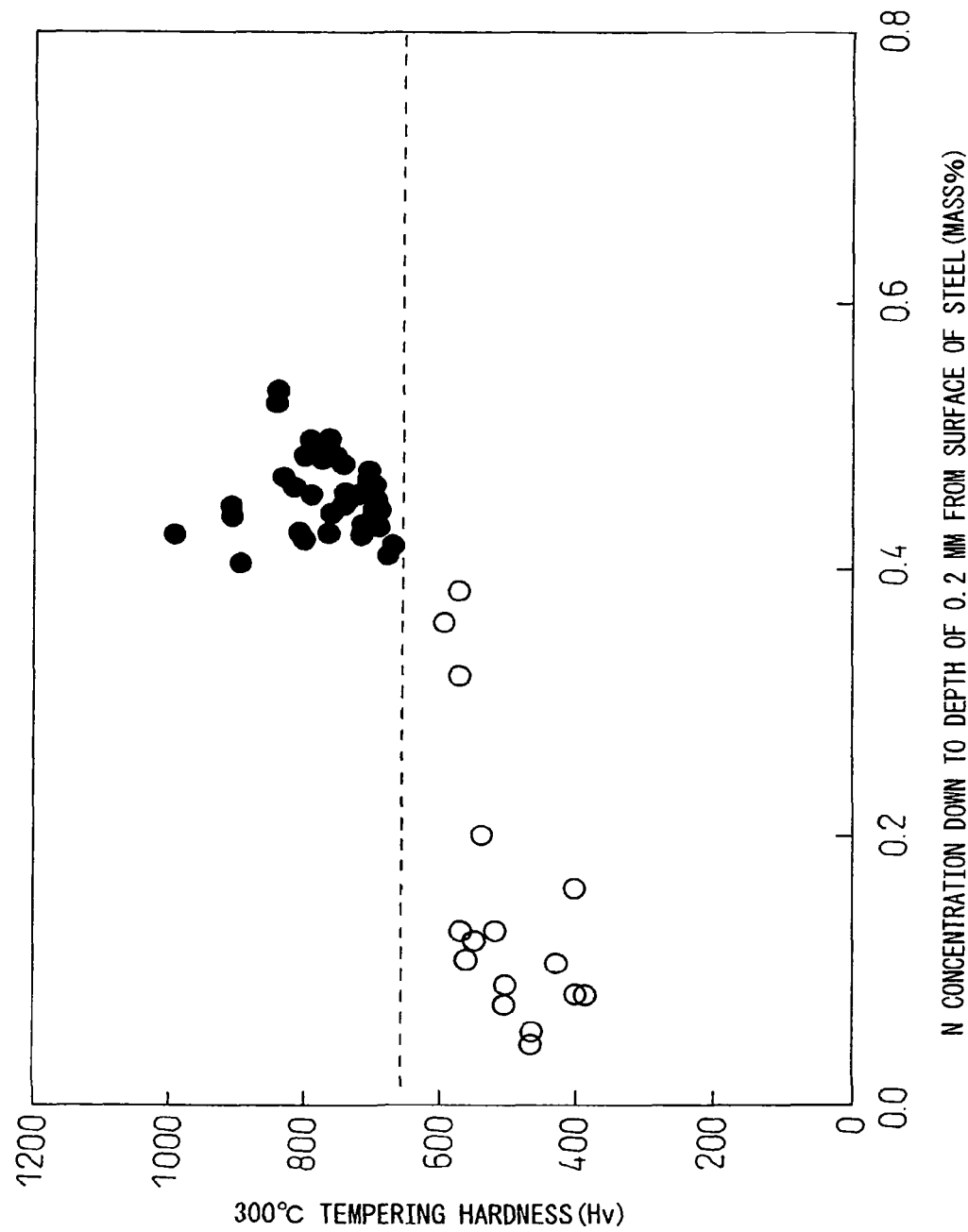

STEEL FOR SURFACE HARDENING FOR MACHINE STRUCTURAL USE AND PART FOR MACHINE STRUCTURAL USE

This application is a divisional application of U.S. application Ser. No. 13/138,174, filed Jul. 14, 2011, a national stage application of International Application No. PCT/JP2010/050742, filed Jan. 15, 2010, which claims priority to Japanese Application No. 2009-007756, filed Jan. 16, 2009, each of which is incorporated by reference in its entirety.

TECHNICAL FIELD

The present invention relates to steel for surface hardening for machine structural use and a part for machine structural use. More particularly, it relates to parts which have high surface fatigue strength which are used for automobiles and other power transmission parts, in particular, gears, continuously variable transmissions, bearings, constant velocity joints, hubs, and other parts for machine structural use.

BACKGROUND ART

Parts for machine structural use, for example, gears of automatic transmissions and sheaves of continuously variable transmissions, bearings, constant velocity joints, hubs, and other power transmission parts are required to have a high surface fatigue strength. In the past, for the above parts, JIS SCr420, SCM420, and other case hardened steels with C of around 0.2% have generally been used for the material, while a hardened layer of a martensite structure with C of around 0.8% has been formed on the surface of the part by carburized quenching so as to raise the surface fatigue strength in use.

However, carburized quenching is treatment which takes a long time of 5 to 10 hours, in some cases more than 10 hours, along with the austenite transformation at the high temperature of around 950° C., so heat treatment deformation (quenching strain) due to the crystal grain coarsening unavoidably becomes greater. For this reason, parts for which a high dimensional precision has been demanded have had to be ground, honed, and otherwise finished after carburized quenching.

In recent years, there has been rising demand for reducing the noise of automobile engines etc., so surface hardening with less heat strain compared with carburized quenching, such as induction hardening and soft nitriding, have come under the spotlight.

Induction hardening heats a steel material in a short time. Since only the necessary part of the surface layer is transformed to austenite and hardened, there is little hardening strain and it is possible to obtain a surface hardened part with a high dimensional precision.

However, to obtain a hardness equivalent to that of a carburized quenched material by only induction hardening, it is necessary to add 0.8% or more of C to the steel material. The hardness of the inside of the material, which has no relation to improvement of the surface fatigue strength, also rises and remarkable deterioration of the machineability occurs. Therefore, it is not possible to just increase the amount of C in the steel material without proper consideration, so there is a limit to improving the surface fatigue strength by just induction hardening.

Soft nitriding is a surface hardening method which causes the diffusion and permeation of mainly nitrogen and carbon simultaneously at the steel material surface in the temperature region below the transformation point of about 500 to 600° C. so as to form a hardened layer and improve the wear resistance, seizing resistance, fatigue resistance, etc.

At the steel material surface, the diffused nitrogen forms nitrides in the steel, forms a compound layer comprised of mainly $Fe_3N$, $Fe_4N$, and other Fe nitrides at the surfacemost layer of a general steel material, and forms a nitrided layer in which N is diffused inside from the surfacemost layer of the steel material.

Soft nitriding can be performed at a low temperature. Compared with the case of carburized quenching, a short treatment time of about 2 to 4 hours is enough, so this is often applied to steel parts where low strain is required.

However, with just, soft nitriding, the hardened layer depth is small, so application to a gear etc. of a transmission at which a high surface pressure is applied is difficult.

Recently, as a method for compensating for the defects in induction hardening and soft nitriding and obtaining better mechanical properties, in particular improving the surface fatigue strength, performing soft nitriding, then induction hardening is being experimented with.

PLT 1 proposes a method of production which combines gas soft nitriding and induction hardening so as to make up for their individual defects and improve the softening resistance and obtain superior mechanical properties, particularly high surface fatigue strength.

The method of production of PLT 1 treats a steel material by gas soft nitriding to form a compound layer, then treats this by induction hardening to break up and diffuse into the steel the nitrogen compounds in the compound layer which is formed by the gas soft nitriding so as to form a hardened nitrided layer.

Note that, in the following explanation, the layer which is comprised of $Fe_3N$, $Fe_4N$, and other Fe nitrides which are formed at the surfacemost layer of the steel material by soft nitriding will be referred to as the "compound layer", while the nitrided layer which is formed by diffusion of N inside of the steel material from the surfacemost layer, when formed without induction hardening, will be referred to as a "nitrided layer" and, when formed with induction hardening, will be referred to as a "hardened nitrided layer" so as to differentiate them.

The steel material which is produced by the method of production of PLT 1 is high in surface hardness, but is low in concentration of N in the hardened nitrided layer, so the hardness of the steel material at the time of a high temperature is low and it is not possible to obtain a sufficient softening resistance at the surface of gears etc. which become a high temperature during operation. As a result, it is not possible to obtain a high surface fatigue strength.

PLT 2 proposes a method of production which combines soft nitriding and induction hardening to obtain a part for machine structural use superior in mechanical properties. In the method of production of PLT 2, elements with a high affinity with N are added to the steel material so as to cause the nitrides in the steel material to break up and be diffused.

However, with the method of production of PLT 2, the amounts of addition of the elements for breaking up and diffusing the nitrides in the steel material are not sufficient, so it is necessary to heat the steel material to 900° C. to 1200° C., an extremely high temperature, by induction heating and make the N form a solid solution in the steel. For this reason, a thick oxide layer is formed at the steel material surface. Due to that oxide layer, the steel material is unavoidably remarkably degraded in mechanical properties.

Further, when converting the compound layer which is obtained by soft nitriding to a hardened nitrided layer by induction hardening, in the method of production of PLT 2, no thought is given to a method of increasing the thickness of the hardened nitrided layer.

Therefore, the part for machine structural use which is obtained by the method of production of PLT 2 is not sufficient in the thickness of the hardened nitrided layer, so does not have a surface fatigue strength good enough for use at a high surface pressure.

PLT 3 proposes the art of combining nitriding and induction hardening to obtain a part for machine structural use which has superior mechanical properties. The part for machine structural use of PLT 3 is obtained by nitriding a steel material at a 600° C. or more high temperature to form a compound layer, then performing induction hardening to form a hardened nitrided layer.

However, the nitriding in PLT 3 is performed at a 600° C. or more high temperature, so the compound layer which is formed is thin and the concentration of N in the compound layer is also low. Therefore, even if nitriding, then induction hardening, the nitrogen compounds in the compound layer which is formed by the nitriding are decomposed and the amount of N which diffuses to the inside of the steel material is small.

That is, with nitriding performed at a 600° C. or more high temperature, even if it is possible to form a compound layer, then perform induction hardening to form a hardened nitrided layer, the thickness of the hardened nitrided layer is insufficient, a sufficient softening resistance cannot be obtained, and as a result a part for machine structural use which has a good surface fatigue strength cannot be obtained.

PLT 4 proposes a method of production of a machine structure part comprising performing soft nitriding under conditions giving a nitrided layer depth of 150 μm or more, then performing induction hardening under conditions where the nitrided layer is transformed to austenite so as to thereby form a hardened nitrided layer.

However, the part for machine structural use which is produced by the method of production which is proposed in PLT 4 has a thickness of the hardened nitrided layer of 0.3 mm even at the maximum. The surface fatigue strength is not sufficient.

PLT 5 proposes a part for machine structural use which is obtained by heat treating a hot worked steel material for graphite precipitation, then cold working it and finally nitriding it.

However, the part for machine structural use of PLT 5 uses the precipitated graphite to improve the machineability. The precipitated graphite at the steel material surface causes the surface fatigue strength to drop.

Therefore, even if treating the part for machine structural use of PLT 5 by induction hardening to form a hardened nitrided layer, it is difficult to use the part for machine structural use of PLT 5 as a gear or other power transmission part of a transmission where a high surface pressure is applied to the surface of the part for machine structural use.

Further, in general, gears and other power transmission parts are obtained by forging, then machining the materials to finish them to the shapes of the parts, then surface hardening them to obtain the completed parts. The proposals in the above PLTs 1 to 5 are arts aimed at raising the strength of the operating surfaces by treating medium carbon steel containing alloy elements for surface hardening.

Therefore, since the machineability is not considered, the unnecessary rise in hardness at the inside of the steel material causes a drop in the productivity at the time of machining and therefore the manufacturing costs unavoidably rise.

Accordingly, it is desired to improve the surface fatigue strength of a steel material while keeping down a rise in hardness inside the steel material and preventing a drop in machineability.

CITATIONS LIST

Patent Literature

PLT 1: Japanese Patent Publication (A) No. 6-172961
PLT 2: Japanese Patent Publication (A) No. 7-90363
PLT 3: Japanese Patent Publication (A) No. 2007-77411
PLT 4: Japanese Patent Publication (A) No. 7-90364
PLT 5: Japanese Patent Publication (A) No. 2008-169485

SUMMARY OF INVENTION

Technical Problems

The present invention, in view of the above situation, has as its object the provision of steel for surface hardening for machine structural use which can be used for parts which have a good dimensional precision which cannot be obtained by carburized quenching, which is improved in the surface hardness, inside hardness, and softening resistance which are insufficient with soft nitriding alone or induction hardening alone, which have a high surface fatigue strength, and which are subjected to a high surface pressure not only at ordinary temperature of course, but also a 300° C. or so high temperature, and a steel part for machine structural use which uses that steel for surface hardening for machine structural use.

Solution to Problem

To improve the surface fatigue strength of a steel part, it is necessary to improve the surface hardness, increase the surface hardened layer depth, and improve the softening resistance for maintaining high temperature strength at an operating surface which becomes a high temperature (around 300° C.).

Further, to prevent a drop in the productivity, it is also desirable to prevent a drop in the machineability of a material along with improvement of the surface fatigue strength and to form a lubricating film at the steel material surface for preventing seizing or sticking of the operating surfaces with each other.

To deal with these problems, the inventors engaged in various studies on the surface hardenability of steel materials involving combining soft nitriding and induction hardening so as to improve the surface fatigue strength of the steel materials and also studied machineability and lubricating films. As a result, they obtained the following findings:
a) To increase the softening resistance, it is effective to make the hardened nitrided layer which is formed on the steel material surface thicker and make the concentration of N in the hardened nitrided layer higher.

Soft nitriding forms a compound layer on the surfacemost layer of a steel material and forms a nitrided layer at the inside from that surfacemost layer. However, the compound layer which is formed by soft nitriding is very thin. The nitrided layer which is formed inside from the compound layer also does not have a thickness which is sufficient for increasing the softening resistance. The concentration of N inside of the nitrided layer is also not sufficient.

Therefore, the invention performs soft nitriding, then induction hardening so as to break down the compound layer which is formed by the soft nitriding (layer mainly comprised of $Fe_3N$, $Fe_4N$, and other Fe nitrides) by the induction heating, make a sufficient amount of N diffuse inside the steel, and form a hardened nitrided layer.

The thus obtained hardened nitrided layer gives the steel material a sufficient softening resistance and results in a Vicker's hardness of 650 or more when tempered at 300° C. Further, the steel material which has such a hardened nitrided layer has a good surface fatigue strength and can be used not only at ordinary temperature of course, but also at the time of a 300° C. or so high temperature.

FIG. 1 is a view showing an example of comparison of the cross-sectional hardness distributions of steel materials from the surfaces to the core directions for a steel material as soft nitrided and a steel material which is soft nitrided, then induction hardened. In FIG. 1, reference numeral 1 shows the cross-sectional hardness distribution of a steel material as soft nitrided, while reference numeral 2 shows the hardness distribution of the steel material which is soft nitrided, then induction hardened.

As shown in FIG. 1, the steel material 1 as soft nitrided is formed with a compound layer at its surfacemost layer. This exhibits an extremely high hardness, but the thickness of the compound layer is small. On the other hand, the steel material 2 which is soft nitrided, then induction hardened has Fe nitrides which are present in the compound layer of the surfacemost layer decomposed by induction heating and has the N derived from the decomposed Fe nitrides diffused inside of the steel material. As a result, while the hardness of the surfacemost layer of the steel material 2 falls somewhat, a hardened nitrided layer which has sufficient hardness is formed thickly inside from the surfacemost layer. That is, the compound layer of the surfacemost layer which is formed by the soft nitriding functions as a source of N for formation of the hardened nitrided layer.

Note that, the surface layer of the steel material 2 after the induction hardening is a martensite structure, while the core part is a ferrite-pearlite structure.

By making the thickness of the compound layer which is decomposed by the induction heating 10 µm or more, a high N concentration hardened nitrided layer is deeply obtained. The compound layer which is formed by the soft nitriding becomes brittle depending on the soft nitriding conditions and sometimes degrades the mechanical properties, so the compound layer is generally made thin.

In the present invention, the compound layer is deliberately made thicker. That is, by making the compound layer 10 µm or more, it is possible to make the hardened nitrided layer which is formed by induction hardening a high N concentration martensite structure. The steel material is remarkably increased in softening resistance.

b) To form a thick compound layer by soft nitriding, it is effective to reduce the S interfering with the bonding of N with the steel. If the S in the steel material forms a solid solution alone, the S will easily concentrate at the steel material surface and will obstruct entry of N into the steel material surface. To prevent this, a certain amount or more of Mn is added and the S is immobilized in the steel in the state of MnS and thereby rendered harmless. The effect of such rendition remarkably appears by making Mn/S≥70. As a result, it is possible to form a compound layer of a 10 µm or more thickness.

c) To prevent the machineability from being degraded even if raising the surface fatigue strength, it is preferable to not raise the hardness of the inside of the steel material more than necessary. Furthermore, it is preferable to add elements which raise the surface fatigue strength while improving the machineability.

To prevent the hardness of the inside of the steel material from rising more than necessary, it is effective to not excessively add Mn, N, and other alloy elements.

Further, it is also possible to add Al and B compositely as elements which improve the surface fatigue strength while improving the machineability. B combines with the N in the steel to remain in the steel as BN and thereby improves the machineability.

B forms BN during the cooling in a forging process. In a forging process, the cooling speed of the steel material is usually slow, so even if forming BN, the hardness is not raised and the machineability is not lowered.

The BN which is formed in the forging process is decomposed by the induction heating at the time of the induction hardening and becomes solid solution B. By the rapid cooling at the time of hardening, this causes the surface layer hardness of the steel material to greatly rise and also contributes to the improvement of the surface fatigue strength.

Al is an element which remains in the steel in a solid solution state to thereby remarkably improve the machineability. Al has almost no effect in raising the hardness of the steel material. Further, at the time of soft nitriding, Al has the effect that it forms a compound with N and raises the concentration of N near the surface layer. It is also an element effective for improving the surface fatigue strength.

Further, by adding Al and B compositely, the B forms BN which is effective for improvement of the machineability. Further, this BN is decomposed by induction hardening into B and N. It is therefore possible to obtain a hardened nitrided layer with a high concentration of N. The resultant B improves the hardenability of the steel material, so a high surface fatigue strength can be obtained.

Furthermore, by forming BN and thereby consuming the N in the steel material, it is possible to keep Al from forming a compound with N and obtain more solid solution Al. The machineability is also improved.

d) To prevent seizing or sticking of the operating surfaces, it is effective to provide an oil reservoir so that a film of a lubricant is continuously formed on the surface of a steel part. The steel material of the present invention has a hardened nitrided layer which is obtained by using soft nitriding to form a compound layer, then breaking up the Fe nitrides in the compound layer by induction heating and transforming the steel material to austenite for hardening.

FIG. 2 give views showing the structures of a hardened nitrided layer which is observed under an optical microscope and scan type electron microscope. FIG. 2A shows the structure which is observed under an optical microscope, while FIG. 2B shows the structure which is obtained under the scan type electron microscope.

As shown in FIG. 2, the hardened nitrided layer 10 has a large number of holes 20 which are formed by decomposition of the nitrogen compounds in the compound layer and forms a hard porous layer 30. This porous layer 30 functions as an oil reservoir. It improves the lubrication effect and further improves the wear resistance and durability of the steel material.

Note that, by controlling the soft nitriding conditions and induction heated conditions, it is possible to make the size of the hole 0.1 to 1 µm in an equivalent circle diameter, the density of presence of the holes 20 10,000 holes/mm$^2$ or more, and the range of presence of the holes 20 a depth of 5 μm or more from the surface of the steel part. These effectively function as an oil reservoir.

The present invention was completed based on the above findings and has as its gist the following:

(1) Steel for surface hardening for machine structural use which contains, by mass %,
C: 0.3 to 0.6%,
Si: 0.02 to 2.0%,
Mn: 0.35 to less than 1.5%, and
Al: 0.01 to 0.5%,
is restricted to
B: less than 0.0003%,
S: 0.0001 to 0.021%,
N: 0.003 to 0.0055%,
P: 0.0001 to 0.03%, and
O: 0.0001 to 0.0050%,
has a ratio Mn/S of Mn and S satisfying 70 to 30,000, has a balance of Fe and unavoidable impurities, and has a surface hardenability of a Vicker's hardness of 650 or more after nitriding, induction hardening, and tempering at 300° C.

(2) Steel for surface hardening for machine structural use which contains, by mass %,
C: 0.3 to 0.6%,
Si: 0.02 to 2.0%,
Mn: 0.35 to less than 1.5%,
Al: 0.01 to 0.5%, and
B: 0.0003 to 0.005%,
is restricted to
S: 0.0001 to 0.021%,
N: 0.003 to 0.0055%,
P: 0.0001 to 0.03%, and
O: 0.0001 to 0.0050%,
has a ratio Mn/S of Mn and S satisfying 70 to 30,000, has a balance of Fe and unavoidable impurities, and has a surface hardenability of a Vicker's hardness of 650 or more after nitriding, induction hardening, and tempering at 300° C.

(3) Steel for surface hardening for machine structural use as set forth in (1) or (2), characterized in that the steel further contains, by mass %, one or more of
W: 0.0025 to 0.5%,
Cr: 0.2 to 2.0%,
Mo: 0.05 to 1.0%,
V: 0.05 to 1.0%,
Nb: 0.005 to 0.3%,
Ti: 0.005 to 0.2%,
Ni: 0.05 to 2.0%, and
Cu: 0.01 to 2.0%.

(4) Steel for surface hardening for machine structural use as set forth in (1) or (2), characterized in that the steel further contains, by mass %, one or more of
Ca: 0.0005 to 0.01%,
Mg: 0.0005 to 0.01%,
Zr: 0.0005 to 0.05%, and
Te: 0.0005 to 0.1%.

(5) Steel for surface hardening for machine structural use which contains, by mass %,
C: 0.3 to 0.6%,
Si: 0.02 to 2.0%,
Mn: 0.35 to less than 1.5%, and
Al: 0.01 to 0.5%,
contains one or more of
W: 0.0025 to 0.5%,
Cr: 0.2 to 2.0%,
Mo: 0.05 to 1.0%,
V: 0.05 to 1.0%,
Nb: 0.005 to 0.3%,
Ti: 0.005 to 0.2%,
Ni: 0.05 to 2.0%, and
Cu: 0.01 to 2.0%,
contains one or more of
Ca: 0.0005 to 0.01%,
Mg: 0.0005 to 0.01%,
Zr: 0.0005 to 0.05%, and
Te: 0.0005 to 0.1%,
is restricted to
B: less than 0.0003%,
S: 0.0001 to 0.021%,
N: 0.003 to 0.0055%,
P: 0.0001 to 0.03%, and
O: 0.0001 to 0.0050%,
has a ratio Mn/S of Mn and S satisfying 70 to 30,000, has a balance of Fe and unavoidable impurities, and has a surface hardenability of a Vicker's hardness of 650 or more after nitriding, induction hardening, and tempering at 300° C.

(6) Steel for surface hardening for machine structural use which contains, by mass %,
C: 0.3 to 0.6%,
Si: 0.02 to 2.0%,
Mn: 0.35 to less than 1.5%,
Al: 0.01 to 0.5%, and
B: 0.0003 to 0.005%,
contains one or more of
W: 0.0025 to 0.5%,
Cr: 0.2 to 2.0%,
Mo: 0.05 to 1.0%,
V: 0.05 to 1.0%,
Nb: 0.005 to 0.3%,
Ti: 0.005 to 0.2%,
Ni: 0.05 to 2.0%, and
Cu: 0.01 to 2.0%,
contains one or more of
Ca: 0.0005 to 0.01%,
Mg: 0.0005 to 0.01%,
Zr: 0.0005 to 0.05%, and
Te: 0.0005 to 0.1%,
is restricted to
S: 0.0001 to 0.021%,
N: 0.003 to 0.0055%,
P: 0.0001 to 0.03%, and
O: 0.0001 to 0.0050%,
has a ratio Mn/S of Mn and S satisfying 70 to 30,000, has a balance of Fe and unavoidable impurities, and has a surface hardenability of a Vicker's hardness of 650 or more after nitriding, induction hardening, and tempering at 300° C.

(7) A steel part for machine structural use characterized by comprising steel for surface hardening for machine structural use as set forth in (1) or (2) which, when nitrided, then induction hardened and tempered at 300° C., has a Vicker's hardness of 650 or more down to a depth of 0.2 mm from the surface of the steel for surface hardening for machine structural use.

(8) A steel part for machine structural use characterized by comprising steel for surface hardening for machine structural use as set forth in (1) or (2) which, when nitrided, then induction hardened to form a hardened nitrided layer and tempered at 300° C., has a Vicker's hardness of 650 or more and has holes 0.1 to 1 μm in an equivalent circle diameter down to a depth of at least 5 μm from the surface of the hardened nitrided layer present on a scale of 10,000 holes/mm$^2$ or more.

(9) A steel part for machine structural use characterized by comprising steel for surface hardening for machine structural use as set forth in (1) or (2) which, when nitrided, then induction hardened to form a hardened nitrided layer and tempered at 300° C., has a Vicker's hardness of 650 or more down to a depth of 0.2 mm from the surface of the steel for surface hardening for machine structural use and has holes of 0.1 to 1 μm in an equivalent circle diameter down to a depth of at least 5 μm from the surface of the hardened nitrided layer present on a scale of 10,000 holes/mm$^2$ or more.

(10) A steel part for machine structural use characterized by comprising steel for surface hardening for machine structural use as set forth in (3) which, when nitrided, then induction hardened and tempered at 300° C., has a Vicker's hardness of 650 or more down to a depth of 0.2 mm from the surface of the steel for surface hardening for machine structural use.

(11) A steel part for machine structural use characterized by comprising steel for surface hardening for machine structural use as set forth in (3) which, when nitrided, then induction hardened to form a hardened nitrided layer and tempered at 300° C., has a Vicker's hardness of 650 or more and has holes 0.1 to 1 μm in an equivalent circle diameter down to a depth of at least 5 μm from the surface of the hardened nitrided layer present on a scale of 10,000 holes/mm$^2$ or more.

(12) A steel part for machine structural use characterized by comprising steel for surface hardening for machine structural use as set forth in (3) which, when nitrided, then induction hardened to form a hardened nitrided layer and tempered at 300° C., has a Vicker's hardness of 650 or more down to a depth of 0.2 mm from the surface of the steel for surface hardening for machine structural use and has holes of 0.1 to 1 μm in an equivalent circle diameter down to a depth of at least 5 μm from the surface of the hardened nitrided layer present on a scale of 10,000 holes/mm$^2$ or more.

(13) A steel part for machine structural use characterized by comprising steel for surface hardening for machine structural use as set forth in (4) which, when nitrided, then induction hardened and tempered at 300° C., has a Vicker's hardness of 650 or more down to a depth of 0.2 mm from the surface of the steel for surface hardening for machine structural use.

(14) A steel part for machine structural use characterized by comprising steel for surface hardening for machine structural use as set forth in (4) which, when nitrided, then induction hardened to form a hardened nitrided layer and tempered at 300° C., has a Vicker's hardness of 650 or more and has holes of a 0.1 to 1 μm in an equivalent circle diameter down to a depth of at least 5 μm from the surface of the hardened nitrided layer present on a scale of 10,000 holes/mm$^2$ or more.

(15) A steel part for machine structural use characterized by comprising steel for surface hardening for machine structural use as set forth in (4) which, when nitrided, then induction hardened to form a hardened nitrided layer and tempered at 300° C., has a Vicker's hardness of 650 or more down to a depth of 0.2 mm from the surface of the steel for surface hardening for machine structural use and has holes 0.1 to 1 μm in an equivalent circle diameter down to a depth of at least 5 μm from the surface of the hardened nitrided layer present on a scale of 10,000 holes/mm$^2$ or more.

(16) A steel part for machine structural use characterized by comprising steel for surface hardening for machine structural use as set forth in (5) which, when nitrided, then induction hardened and tempered at 300° C., has a Vicker's hardness of 650 or more down to a depth of 0.2 mm from the surface of the steel for surface hardening for machine structural use.

(17) A steel part for machine structural use characterized by comprising steel for surface hardening for machine structural use as set forth in (5) which, when nitrided, then induction hardened to form a hardened nitrided layer and tempered at 300° C., has a Vicker's hardness of 650 or more and has holes 0.1 to 1 μm in an equivalent circle diameter down to a depth of at least 5 μm from the surface of the hardened nitrided layer present on a scale of 10,000 holes/mm$^2$ or more.

(18) A steel part for machine structural use characterized by comprising steel for surface hardening for machine structural use as set forth in (5) which, when nitrided, then induction hardened to form a hardened nitrided layer and tempered at 300° C., has a Vicker's hardness of 650 or more down to a depth of 0.2 mm from the surface of the steel for surface hardening for machine structural use and has holes 0.1 to 1 μm in an equivalent circle diameter down to a depth of at least 5 μm from the surface of the hardened nitrided layer present on a scale of 10,000 holes/mm$^2$ or more.

(19) A steel part for machine structural use characterized by comprising steel for surface hardening for machine structural use as set forth in (6) which, when nitrided, then induction hardened and tempered at 300° C., has a Vicker's hardness of 650 or more down to a depth of 0.2 mm from the surface of the steel for surface hardening for machine structural use.

(20) A steel part for machine structural use characterized by comprising steel for surface hardening for machine structural use as set forth in (6) which, when nitrided, then induction hardened to form a hardened nitrided layer and tempered at 300° C., has a Vicker's hardness of 650 or more and has holes 0.1 to 1 μm in an equivalent circle diameter down to a depth of at least 5 μm from the surface of the hardened nitrided layer present on a scale of 10,000 holes/mm$^2$ or more.

(21) A steel part for machine structural use characterized by comprising steel for surface hardening for machine structural use as set forth in (6) which, when nitrided, then induction hardened to form a hardened nitrided layer and tempered at 300° C., has a Vicker's hardness of 650 or more down to a depth of 0.2 mm from the surface of the steel for surface hardening for machine structural use and has holes 0.1 to 1 μm in an equivalent circle diameter down to a depth of at least 5 μm from the surface of the hardened nitrided layer present on a scale of 10,000 holes/mm$^2$ or more.

Advantageous Effects of Invention

The steel for surface hardening for machine structural use of the present invention, by soft nitriding, then induction hardening, is remarkably increased in hardness at the surface of the steel material and is increased in softening resistance to thereby give a high surface fatigue strength.

The parts for machine structural use of the present invention can be used for power transmission parts of automobiles etc. for which a high surface fatigue strength is demanded not only at ordinary temperature of course, but also under usage conditions resulting in a high temperature of around 300° C., for example, gears, continuously variable transmissions, bearings, constant velocity joints, hubs, etc. They greatly contribute to the higher output and lower cost of automobiles etc.

BRIEF DESCRIPTION OF DRAWINGS

FIG. 2 gives views showing the structure of a hardened nitrided layer observed by an optical microscope and scan type electron microscope. FIG. 2A shows the structure which is observed by an optical microscope, while FIG. 2B shows the structure which is observed by a scan type electron microscope.

FIG. 3 is a view showing the relationship between the Mn/S at the time of soft nitriding and the compound thickness.

FIG. 4 is a view showing the relationship between the concentration of N at a depth of 0.2 mm from the surface of the steel after induction hardening and the Vicker's hardness (Hv) at the time of tempering at 300° C.

DESCRIPTION OF EMBODIMENTS

Figure 1:
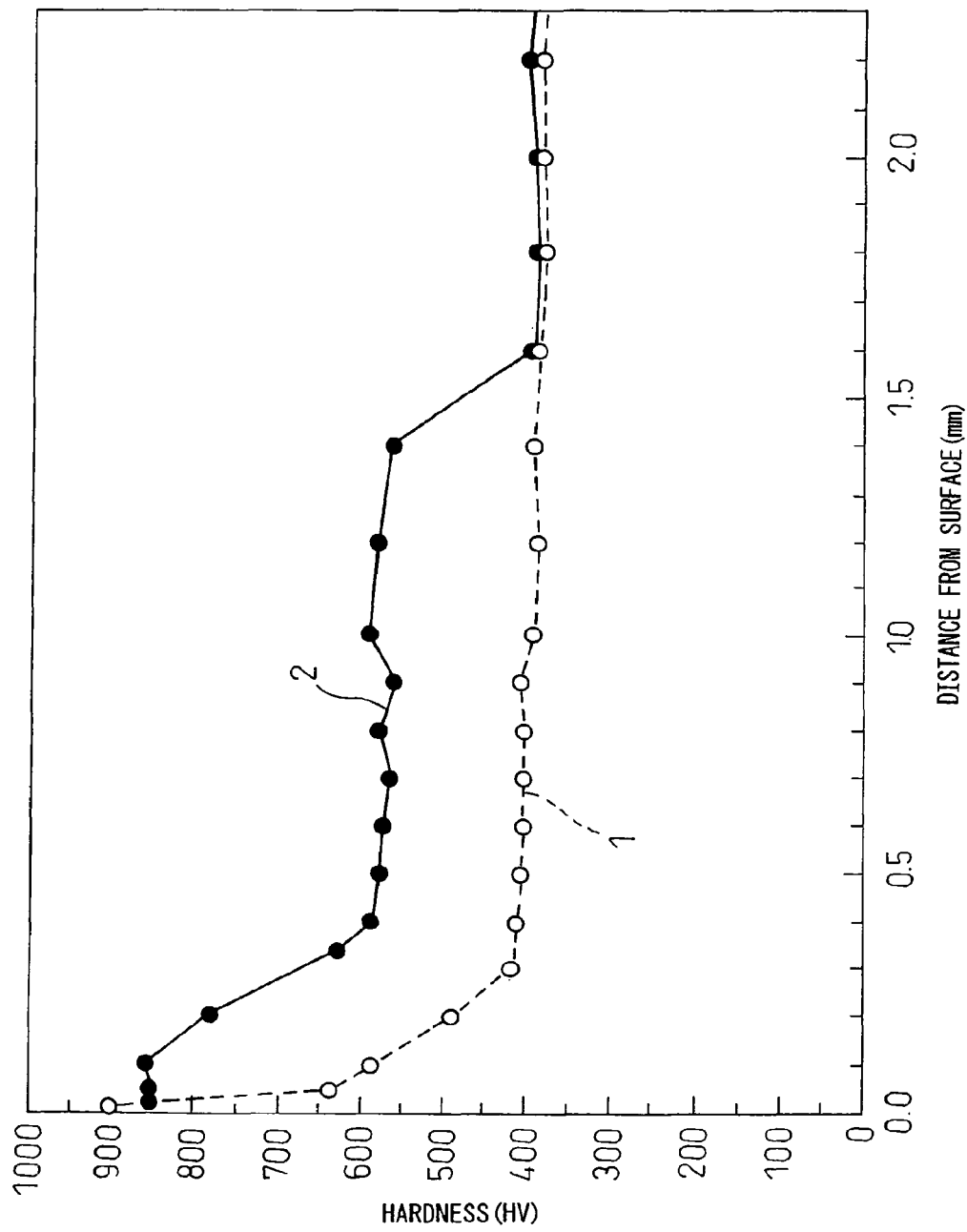
FIG. 1 is a view showing an example of comparison of the cross-sectional hardness distributions of steel materials from the surfaces to the core directions for a steel material as soft nitrided and a steel material which is soft nitrided, then induction hardened.

The present invention treats a steel material, to which suitable amounts of Si, Mn, and Al have been added, by soft nitriding, then induction hardening to form a deep hardened nitrided layer with a high concentration of N, and improve the surface hardness and softening resistance to thereby obtain a high surface fatigue strength not only at ordinary temperature of course, but also at a 300° C. or so high temperature.

First, the reasons for limitation of the necessary added elements in present invention will be explained. Note that, the % of the chemical composition show the mass %.

C: 0.3 to 0.6%

C is an important element for obtaining the strength of the steel. In particular, it is an element which is necessary for reducing the ferrite fraction of the micro structure before induction hardening, improving the hardenability at the time of induction hardening, and increasing the hardened layer depth. If the amount of addition of C is less than 0.3%, the ferrite fraction is high and the hardening at the time of induction hardening becomes insufficient, so the lower limit of the amount of addition of C was made 0.3%. On the other hand, if the amount of addition of C is excessive, the machineability and forgeability at the time of part fabrication are remarkably impaired and, furthermore, the possibility of cracks occurring at the time of induction hardening becomes greater, so the upper limit of the amount of addition of C was made 0.6%.

Si: 0.02 to 2.0%

Si has the effect of increasing the softening resistance of the hardened layer so as to improve the surface fatigue strength. To obtain that effect, the amount of addition of Si has to be at least 0.02%. On the other hand, if the amount of addition of Si is over 2.0%, the decarburization at the time of forging becomes remarkable, so 2.0% was made the upper limit.

Mn: 0.35 to less than 1.5%

Mn is an element effective for improving the hardenability and increasing the softening resistance to improve the surface fatigue strength. Furthermore, it has the effects of immobilizing the S in the steel as MnS so as to prevent S from concentrating at the steel material surface and N from invading the steel and of promoting the formation of a thick compound layer by soft nitriding. To immobilize the S in the steel as MnS to render it harmless, it is necessary to make Mn/S≥70. Further, it lowers the ferrite fraction of the structure before induction hardening and improves the hardenability at the time of induction hardening. To obtain that effect, Mn has to be added in 0.35% or more. If adding a suitable amount of Mn, the hardenability at the time of induction hardening is improved, so the hardness of the steel material after hardening rises and the surface fatigue strength is improved. However, if adding Mn in 1.5% or more, the hardness of the material rises more than necessary, the machineability of the material before soft nitriding is remarkably degraded, and the productivity is degraded. For this reason, the amount of addition of Mn is made less than 1.5%.

Mn/S: 70 to 30000

As explained above, to prevent the concentration of S at the steel material surface, it is necessary to add Mn to S by a certain ratio or more and render the S harmless by MnS. If the ratio Mn/S of the amounts of addition of Mn and S is 70 or more, the effect of rendering the S harmless is remarkably improved. However, if Mn/S is less than 70, S concentrates at the steel material surface and formation of a compound layer at the time of soft nitriding is inhibited, so Mn/S was made 70 or more.

FIG. 3 is a view showing the relationship between the Mn/S at the time of soft nitriding under the conditions explained later and the compound thickness. As clear from FIG. 3, by making Mn/S 70 or more, after the soft nitriding, a 10 μm or more thickness compound layer is obtained. On the other hand, even if Mn/S exceeds 30000, the effect of rendering the S harmless becomes saturated, so the upper limit of Mn/S was made 30000.

Al: 0.01 to 0.5%

Al is an element which precipitates and diffuses in the steel as Al nitrides and thereby effectively acts to increase the grain fineness of the austenite structure at the time of induction hardening and, furthermore, improves the hardenability and increases the hardened layer depth. Further, it is an element which is effective for improvement of the machineability. Therefore, the amount of addition of Al has to be 0.01% or more. Further, it is an element which has the effect of bonding with N at the time of soft nitriding and raising the concentration of N near the surface layer of the steel material and is also effective for improving the surface fatigue strength. Therefore, the amount of addition of Al has to be made 0.01% or more. On the other hand, if the amount of addition of Al exceeds 0.5%, the precipitates (Al nitrides) will coarsen and cause the steel to become brittle, so the upper limit was made 0.5%.

B: less than 0.0003%

B is unavoidably included in steel. Even so, by restricting the content of B to less than 0.0003%, it does not detract from the advantageous effect of the present invention.

B: 0.0003 to 0.005%

If B is added into the steel, the N and B in the steel bond to form BN in the steel, but at the time of induction heating, the BN is decomposed and releases the B. This greatly improves the hardenability and improves the surface fatigue strength. To obtain that effect, the amount of addition of B has to be made 0.0003% or more. On the other hand, even if the amount of addition of B is over 0.005%, that effect becomes saturated. Furthermore, it becomes a cause of cracking at the time of rolling and forging, so 0.005% was made the upper limit. Note that, BN is formed during heat treatment with a slow cooling speed and during cooling in cold working with a normally slow cooling speed. Therefore, at the time of machining performed after cold working and before soft nitriding and induction hardening, BN improves the machineability. After machining, induction hardening causes the BN to break up resulting in a hardened nitrided layer. That hardened nitrided layer improves the surface fatigue strength. Therefore, this is perfect for production of a part for machine structural use where high surface fatigue strength is demanded.

S: 0.0001 to 0.021%

S has the effect of improving the machineability. However, S is a soft nitriding inhibiting element which concentrates at the steel material surface to thereby obstruct the entry of N to the steel material at the time of soft nitriding. If the amount of addition of S exceeds 0.021%, the entry of N into the steel material is remarkably inhibited and, furthermore, the forgeability is remarkably degraded. Therefore, to improve the machineability, when including S, it is necessary to make the content 0.021% or less. On the other hand, the industrial lower limit of the amount of addition of S was made 0.0001%. Note that, as explained above, to immobilize the S in the steel as MnS and eliminate its inhibitory effect on soft nitriding, the lower limit of Mn/S is made 70. On the other hand, even if Mn/S exceeds 30,000, the effect of eliminating the inhibitory effect on soft nitriding becomes saturated, so the upper limit of Mn/S has to be made 30,000.

N: 0.003 to 0.0055%

N forms various types of nitrides and is effective for increasing the grain fineness of the austenite structure at the time of induction hardening. To obtain that effect, it is necessary to make the amount of addition of N 0.003% or more. On the other hand, if excessive N is added, the hardness rises. Furthermore, the N and Al bond to form AlN, whereby the amount of solid solution Al effective for improvement of the machineability is reduced, so the machineability is degraded. Further, the excessively added N causes the ductility in the high temperature region to drop. Furthermore, it forms coarse AlN or coarse BN, so makes the material remarkably brittle resulting in cracks at the time of rolling and forging. Therefore, the amount of addition of N has to be limited to 0.0055% or less.

P: 0.0001 to 0.03%

P segregates at the grain boundaries and causes the toughness to drop, so is preferably reduced as much as possible. It has to be limited to 0.03% or less. The lower limit of the amount of addition of P is made the industrial limit of 0.0001%.

O: 0.0001 to 0.0050%

O is present in the steel as $Al_2O_3$, $SiO_2$, and other oxide-based inclusions, but if the amount of O is great, such oxides become large in size. Such enlarged oxides form starting points for breakage of power transmission parts, so the content of O has to be limited to 0.0050% or less. The smaller the content of O, the better, so 0.0020% or less is more preferable. In the case of power transmission parts aiming at long service lifetime, 0.0015% or less is further preferable. Note that the lower limit of the content of 0 is made the industrial limit of 0.0001%.

Next, the reasons for restriction of the optionally added elements will be explained.

Elements for Strengthening Steel Material

W: 0.0025 to 0.5%

W is an element which improves the hardenability and thereby improves the surface fatigue strength. However, due to the addition of W, the hardness of the steel material rises and the machineability deteriorates, so there is a limit to the addition of W. To improve the hardenability so as to achieve a great improvement in the surface fatigue strength, the amount of addition of W is preferably made 0.0025% or more. More preferably, it is made 0.03% or more. On the other hand, if the amount of addition of W exceeds 0.5%, that effect becomes saturated and the economy is impaired, so 0.5% was made the upper limit.

Cr: 0.2 to 2.0%

Cr has the effect, by addition, of improving the nitriding characteristics and the softening resistance of the hardened layer and of improving the surface pressure fatigue strength. To obtain that effect, the amount of addition of Cr is preferably made 0.2% or more. On the other hand, if the amount of addition of Cr exceeds 2.0%, the machineability deteriorates, so the upper limit of the amount of addition of Cr is preferably made 2.0%.

Mo: 0.05 to 1.0%

Mo, by addition, has the effect of improving the softening resistance of the hardened layer and improving the surface fatigue strength plus the effect of strengthening and toughening the hardened layer to improve the bending fatigue strength. To obtain these effects, the amount of addition of Mo is preferably made 0.05% or more. On the other hand, even if the amount of addition of Mo exceeds 1.0%, these effects are saturated and economy is impaired, so the upper limit of the amount of addition of Mo is preferably made 1.0%.

V: 0.05 to 1.0%

V, by addition, precipitates and diffuses as nitrides in the steel and is effective for increasing the grain fineness of the austenite structure at the time of induction hardening. To obtain that effect, the amount of addition of V has to be made 0.05% or more. On the other hand, even if the amount of addition of V exceeds 1.0%, that effect becomes saturated and economy is impaired, so the upper limit of the amount of addition of V is preferably made 1.0%.

Nb: 0.005 to 0.3%

Nb, by addition, precipitates and diffuses as nitrides in the steel and is effective for increasing the grain fineness of the austenite structure at the time of induction hardening. To obtain that effect, the amount of addition of Nb is preferably 0.005% or more. On the other hand, even if the amount of addition of Nb exceeds 0.3%, that effect becomes saturated and economy is impaired, so the upper limit of the amount of addition of Nb is preferably made 0.3%.

Ti: 0.005 to 0.2%

Ti, by addition, precipitates and diffuses as nitrides in the steel and is effective for increasing the grain fineness of the austenite structure at the time of induction hardening. To obtain that effect, the amount of addition of Ti is preferably 0.0005% or more. On the other hand, if the amount of addition of Ti exceeds 0.2%, the precipitates (Ti nitrides) coarsen and cause the steel to become brittle, so the upper limit of the amount of addition of Ti is preferably made 0.2%.

Ni: 0.05 to 2.0%

Ni, by addition, has the effect of further improving the toughness. To obtain that effect, it is preferable to make the amount of addition of Ni 0.05% or more. On the other hand, if the amount of addition of Ni exceeds 2.0%, the machineability deteriorates, so the upper limit of the amount of addition of Ni is preferably made 2.0%.

Cu: 0.01 to 2.0%

Cu is effective for strengthening the ferrite and improving the hardenability and corrosion resistance. If the amount of addition of Cu is less than 0.01%, that effect cannot be observed, so the amount of addition of Cu is preferably made 0.01% or more. On the other hand, even if the amount of addition of Cu exceeds 2.0%, the effect of improvement of the mechanical properties due to improvement of the hardenability becomes saturated, so the upper limit of the amount of addition of Cu is preferably made 2.0%. Note that, if adding Cu, the hot rollability is lowered and defects are easily caused at the time of rolling, so Cu is preferably added simultaneously with Ni.

Elements for Improving Bending Strength

When improvement of the bending fatigue strength of the part for machine structural use is sought, one or more of the following contents of Ca, Mg, Zr, and Te may be added in the following ranges.

Ca: 0.0005 to 0.01%, Mg: 0.0005 to 0.01%, Zr: 0.0005 to 0.05%, Te: 0.0005 to 0.1%

Ca, Mg, Zr, and Te are all elements which suppress the flattening of MnS present in the steel, improve the bending fatigue strength more, and make bending fatigue fracture of the gears and fatigue fracture of the spline bottoms of shaft parts more difficult. The effect of suppression of flattening of MnS is obtained by adding Ca in 0.0005% or more, Mg in 0.0005% or more, Zr in 0.0005% or more, and Te in 0.0005% or more. Therefore, it is preferable to make Ca: 0.0005%, Mg: 0.0005%, Zr: 0.0005%, and Te: 0.0005% the lower limits of the amounts of addition. On the other hand, even if adding Ca in more than 0.01%, Mg in more than 0.01%, Zr in more than 0.05%, and Te in more than 0.1%, the effect of suppression of flattening of MnS becomes saturated and the economy is impaired. Therefore, it is preferable to make Ca: 0.01%, Mg: 0.01%, Zr: 0.05%, and Te: 0.1% the upper limits of the amounts of addition.

Further, in addition to the elements prescribed above, it is possible to include Pb, Bi, Sn, Zn, Rem, and Sb in ranges not impairing the advantageous effects of the present invention.

Next, the thickness and hardness of the hardened nitrided layer at the surface layer of the steel part will be explained.

The steel part of the present invention is a steel part which is treated by soft nitriding, then induction hardening to form a hardened nitrided layer. The surface hardenability of steel after forming the hardened nitrided layer has to be a Vicker's hardness of 650 or more when tempered at 300° C. If the Vicker's hardness is less than 650 when tempered at 300° C., the softening resistance is not sufficiently increased and, as a result, cracks occur and surface fatigue fracture occurs at the operating surfaces (steel part surfaces) which become high in temperature (around 300° C.).

Further, the range of a Vicker's hardness of 650 or more when tempered at 300° C. is preferably down to a depth of 0.2 mm from the surface of the steel. If the range of a Vicker's hardness of 650 or more when tempered at 300° C. is shallower than 0.2 mm from the surface of the steel, the steel part cannot withstand the surface pressure which is applied. In particular, it cannot withstand the surface pressure which is applied at a 300° C. or so high temperature. The steel part therefore fractures by fatigue.

Further, the thickness of the hardened nitrided layer is preferably 0.4 mm or more. If the thickness of the hardened nitrided layer is less than 0.4 mm, when the steel part is subjected to a high surface pressure, surface cracks are formed. Before these surface cracks form starting points for fracture, internal fracture occurs due to spalling and therefore the fatigue life of the steel part becomes shorter.

In the actual steel part, whether the steel part is one which is soft nitrided, then induction hardened can be judged from the distribution of microstructures which are observed by an optical microscope after Nital corrosion of a sample taken from the steel part and the distribution of hardness from the surface to the core.

To form a hardened nitrided layer and obtain a high surface fatigue strength, it is necessary to perform soft nitriding to form a compound layer (a layer mainly comprised of $Fe_3N$, $Fe_4N$, and other Fe nitrides) at the surfacemost layer of the steel. The Fe nitrides in the compound layer are decomposed by the induction heating performed after the soft nitriding whereby a sufficient amount of N is made to diffuse into the steel and a hardened nitrided layer is formed. That is, it is necessary to perform soft nitriding to form a compound layer serving as the source of supply of N for forming a hardened nitrided layer. Further, the hardened nitrided layer which is obtained by soft nitriding, then induction hardening exhibits a high N concentration.

To make a sufficient amount of N diffuse in the steel and thickly form a hardened nitrided layer which is hard and can improve the softening resistance, in particular the hardened softening resistance, it is preferable to make the thickness of the compound layer after soft nitriding 10 μm or more.

Further, the soft nitriding temperature is preferably made 500 to 600° C. in range. If the soft nitriding temperature is over 600° C., it is not possible to make the compound layer 10 μm or more. Furthermore, the concentration of N in the compound layer also becomes lower. Further, if the soft nitriding temperature exceeds 600° C., heat deformation, grain boundary oxidation, etc. of the steel material occur. On the other hand, if the soft nitriding temperature is less than 500° C., the penetration of N into the steel material remarkably falls, so the lower limit of the soft nitriding temperature is preferably made 500° C.

If lengthening the soft nitriding time, the compound layer and nitrided layer depth become larger, but that effect becomes saturated in about 3 hours, so the soft nitriding time is preferably 1 to 3 hours.

The cooling after the soft nitriding may be performed by any of the methods of air cooling, $N_2$ gas cooling, oil cooling, etc.

Further, as the soft nitriding, either of gas soft nitriding or salt bath soft nitriding may be applied.

Note that, so long as a method by which the steel material surface is supplied with nitrogen and the surfacemost layer of the steel material is formed with a 10 μm or more compound layer, not only soft nitriding, but also nitriding (meaning a surface hardening method treating the surface by only $NH_3$ for a long period of time and industrially differentiated from soft nitriding which uses a mixed atmosphere of $NH_3$ and $CO_2$ (in some cases, a mixed atmosphere further having $N_2$ mixed in) to enable treatment in a short period of 1 to 3 hours) may be applied.

In the present invention, soft nitriding is more preferable than nitriding in the point that the surfacemost layer of the steel can be formed with a 10 μm or more compound layer in a short time, but the invention is not limited to soft nitriding.

Further, to break up the compound layer which is formed by soft nitriding on the surfacemost layer of the steel material and cause N to diffuse from that surfacemost layer to the inside of the steel material and thereby obtain a high surface hardenability of a Vicker's hardness of 650 or more when tempered at 300° C., it is necessary, after the soft nitriding, to treat the steel material by induction hardening which heats the material by induction heating to convert it to austenite for hardening and form a hardened nitrided layer.

The heating method which performing the induction hardening has to consider the breakup of the compound layer which is formed by the soft nitriding. The induction heated temperature is made the austenite transformation point to less than 900° C. Further, the holding time is made 0.05 to 5 seconds. Note that, the "holding time" means the time for holding the temperature of the steel material in the range of the austenite transformation point to less than 900° C. from the point of time where the temperature of the induction heated steel material reaches the austenite transformation point.

FIG. 4 is a view showing the relationship between the concentration of N at a depth of 0.2 mm from the surface of the steel after induction hardening and the Vicker's hardness (Hv) at the time of tempering at 300° C.

As clear from FIG. 4, when the Vicker's hardness after 300° C. tempering at a depth of 0.2 mm from the surface of the steel is 650 or more, the concentration of N at a depth of 0.2 mm from the surface of the steel was 0.5% or more.

Further, if the temperature of the induction heating is 900° C. or more, N will unnecessarily diffuse to the inside, the concentration of N at a depth of 0.2 mm from the surface will not become 0.5% or more, the Vicker's hardness when tempered at 300° C. will become less than 650, and, as a result, the surface fatigue strength will not be able to be improved. Further, if the temperature of the induction heating is 900° C. or more, the increase in the oxide layer at the steel material surface will cause degradation of the mechanical properties.

On the other hand, if the temperature of the induction heating is less than the austenite transformation point, the steel material will not transform to martensite, so it is not possible to obtain a high surface hardness.

If the holding time is less than 0.05 second, the breakup of the compound layer and the diffusion of the N produced by the decomposition of the compound layer will become insufficient. On the other hand, if the holding time is over 5 seconds, N will unnecessarily diffuse to the inside, the concentration of N at a depth of 0.2 mm from the surface will not become 0.5% or more, the Vicker's hardness when tempered at 300° C. will become less than 650, and, as a result, the surface fatigue strength will not be able to be improved.

The frequency when performing induction heating is preferably, for a small part, around 400 kHz and, for a large part, around 5 kHz.

The coolant which is used for the hardening may be water, a polymer quenchant, or other water-based coolant with a large cooling ability.

After induction hardening, it is preferable to perform low temperature tempering of around 150° C. in accordance with general carburized quenched parts so as to secure the toughness of the part.

Next, the surface layer structure of the steel material and steel part of the present invention will be explained.

The steel material and steel part of the present invention are soft nitrided, then induction hardened, so have 10,000 holes/mm$^2$ or more holes of 0.1 to 1 μm in an equivalent circle diameter down to a depth of 5 μm or more from the surface.

For example, in a member like a gear in which the surface fatigue due to rolling becomes a cause of fracture, the lubrication of the operating surface is important. If not sufficiently lubricated, the parts will contact each other resulting in seizing or sticking and surface fatigue fracture will occur. To form a sufficient lubricating film, it is effective to provide an oil reservoir at the operating surface so that a film of lubricant is continuously formed.

The steel material and steel part of the present invention have, at the surfacemost layer of the steel material, a hardened nitrided layer which is obtained by using soft nitriding to form a compound layer mainly comprised of $Fe_3N$, $Fe_4N$, and other Fe nitrides, breaking up these Fe nitrides by induction heating, and transforming the steel to austenite for hardening. This hardened nitrided layer is formed by the Fe nitrides in the compound layer being decomposed and the N which is released diffusing to the inside of the steel material. In this process of formation, the locations where the Fe nitrides were present in the compound layer form a large number of dispersed holes. The hardened nitrided layer therefore becomes a hard porous layer. Further, these large number of dispersed holes function as an oil reservoir whereby the lubrication effect is improved and the steel material is further improved in wear resistance and durability.

The holes are of a size of 0.1 to 1 μm in an equivalent circle diameter and a density of 10,000 holes/mm$^2$ or more. Further, these holes function as an oil reservoir if present down to a depth of 5 μm or more from the surface. Such holes are obtained by controlling the conditions of the soft nitriding and induction heating.

Even a compound layer as soft nitrided has a small number of holes, so these have the function as an oil reservoir, but the compound layer as soft nitrided is extremely brittle and cannot withstand a large surface pressure, so the steel material as soft nitrided invites surface fatigue fracture.

If the size of the holes is a circle equivalent diameter of over 1 μm, the surface smoothness of the steel part will deteriorate and form the starting points for pitching and other surface fatigue fracture and the surface fatigue strength will be lowered. On the other hand, if the main dimension of the holes is an equivalent circle diameter of less than 0.1 μm, a sufficient function as an oil reservoir cannot be obtained.

If the density of the holes is less than 10,000 holes/mm$^2$, the holes will not effectively function as an oil reservoir.

Further, gears and other sliding members are generally used until being worn down about 5 μm from the surface of the members, so the holes are preferably present down to a depth of 5 μm or more from the surface of the steel part.

The size and density of the holes depend on the soft nitriding and induction heating conditions. To obtain the size and density of holes which effectively function as an oil reservoir, preferably the soft nitriding temperature is made 580° C. to less than 600° C., the induction heating temperature is made 880° C. to less than 900° C., and the holding time is made 1 to 4 seconds. Note that, these conditions of course satisfy the conditions for obtaining a hardened nitride layer provided at a steel material and steel part having a high surface fatigue strength.

Further, the surface layer after hardening was made a martensite structure, while the core was left as a ferrite-pearlite structure. This is because by making only the surface layer transform to martensite, the surface layer is given compressive residual stress and the surface fatigue strength is improved. If transforming even the core part to martensite, the compressive residual stress of the surface layer ends up being reduced and the surface fatigue strength falls.

Note that, what was explained above was just an illustration of an embodiment of the present invention. Various changes may be made within the scope of description of the claims.

EXAMPLES

Next, the present invention will be explained further by examples, but the conditions of the examples are only illustrations of the conditions which are employed for confirming the workability and advantageous effects of the present invention. The present invention is not limited to these illustrations of the conditions. The present invention can employ various conditions so long as not departing from the gist of the present invention and achieving the object of the present invention.

Each of the steel materials having the chemical compositions shown in Tables 1 to 2 and Tables 4 to 5 was forged and annealed, then fabricated into roller pitching test pieces for evaluation of the surface fatigue strength, that is, a small roller test piece having a cylindrical part with a diameter of 26 mm and a width of 28 mm and a large roller test piece with a diameter of 130 mm and a width of 18 mm.

The small roller test piece and large roller test piece were soft nitrided (nitrided for 2 hours at temperatures shown in Table 3 and Table 6, then cooled by $N_2$ gas, nitriding gas composition: $N_2$ (0.45 $Nm^3/h$)+$NH_3$ (0.5 $Nm^3/h$)+$CO_2$ (0.05 $Nm^3/h$)), then induction hardened (frequency 100 kHz). The coolant used at the time of induction hardening was tapwater or a polymer quenchant. After that, the test pieces were tempered at 150° C. for 60 minutes and used for fatigue tests.

The fabricated small roller test piece and large roller test piece were used for a standard surface fatigue test, that is, a roller pitching fatigue test.

The roller pitching fatigue test was performed by having the small roller test piece pushed against by various hertz, stresses (surface pressures) by the large roller test piece and setting the slip rate at −40% (peripheral speed of large roller test piece being 40% larger than small roller test piece at contacting parts of the small roller test piece and the large roller test piece). Note that, the rotational direction and the contacting parts of the small roller test piece and the large roller test piece are made the same. Further, the temperature of the gear oil which was fed to the contacting parts of the small roller test piece and large roller test piece was made 90° C.

The cutoff number of the test was made the 10 million cycles ($10^7$ cycles) showing the fatigue limit of general steel, while the maximum hertz stress at which 10 million cycles was reached at the small roller test piece without the occurrence of pitching was made the fatigue limit of the small roller test piece. The occurrence of pitching was detected by a vibration meter attached to the tester. After detection of vibration, the rotations of both the small roller test piece and the large roller test piece were made to stop and the occurrence of pitching and rotational speed were confirmed.

Further, for evaluation of the temper softening resistance, a cylindrical hardness measurement test piece of a diameter of 26 mm and a length of 100 mm was fabricated. The hardness measurement test piece was soft nitrided and induction hardened under the same conditions for the small roller test piece and large roller test piece. After that, this was tempered at 300° C. for 60 minutes, was cut cross-sectionally, then was measured for the hardness distribution from the surface to the core of the hardness measurement test piece by a Vicker's hardness meter. Note that, the surface layer of the hardness measurement test piece after induction hardening was a martensite structure, while the core part was left as a ferrite-pearlite structure. Further, together with this, the concentration of N at a depth of 0.2 mm from the surface of the hardness measurement test piece was measured by EPMA.

Further, the density of the holes which have an equivalent circle diameter of 0.1 to 1 μm was found by cutting a hardness measurement test piece, which was soft nitrided and induction hardened under the same conditions as the small roller test piece and large roller test piece, at a cross-section perpendicular to rolling, burying this in resin, polishing it to a mirror finish, then image processing the surfacemost layer part. The image processing was performed at 3000× for 40 fields of 50 μm² each. The number of holes found by image processing was converted to the number of holes per $mm^2$.

Furthermore, for evaluation of the machineability, a cylindrical test piece of a diameter of 45 mm and a length of 100 mm was fabricated. The machineability is evaluated in the state of the material before soft nitriding and induction hardening, so the test piece for evaluation of the machineability was used as is for forging and annealing. The machineability was evaluated by a deep hole drilling test using MQL (minimum quantity lubrication) by an NC machining center used for production of gears, crankshafts, and other auto parts. The number of holes drilled until drill breakage when drilling under the conditions shown in Table 7 was measured. However, when reaching 1000 or more holes, the machineability was judged to be good and the test was cut off.

Table 3 and Table 6 show the results. As shown in Table 3, in each of the invention examples of Examples 1 to 40, the surface fatigue strength (maximum hertz stress) at 10 million cycles ($10^7$ cycles) in a roller pitching fatigue test is a high value of 3700 MPa or more. It is clear that each has a superior surface fatigue strength. It was confirmed that it is possible to obtain good results compared with the comparative examples of Examples 41 to 62 shown in Table 6. Due to such superior surface fatigue strength, the steel material and steel part of the present invention and steel can be used for members upon which a high surface pressure is applied both at ordinary temperature of course and also at a high temperature of around 300° C.

For example, each of the invention examples of Examples 1 to 8 is a steel to which Si, Mn, and Al are added in suitable amounts. Due to the formation of a compound layer of a thickness of 10 μm or more by soft nitriding of less than 600° C. and the 0.08 to 4.9 seconds of induction hardening after that at the austenite transformation point to 900° C., it could be confirmed that a Vicker's hardness of 650 or more after 300° C. tempering is obtained and, as a result, a superior surface fatigue strength is obtained. Further, in each of the invention examples of Examples 1 to 8, the thickness of the hardened nitrided layer is 0.4 mm or more. It could be confirmed that the concentration of N down to a position 0.2 mm from the surface is high. Further, from the number of holes drilled being 1000 or more, it could be confirmed that the machineability after forging (before soft nitriding and induction hardening) was also superior.

Further, even in Examples 9 to 24 where optional elements were added, the surface fatigue strength (maximum hertz stress) at the 10,000 million cycle ($10^7$ cycle) in a roller pitching fatigue strength is a high value of 0.3700 MPa or more. It could be confirmed that a good surface fatigue strength is obtained.

Further, in each of the invention examples of Examples 25 to 40, there are 10,000 holes/$mm^2$ or more holes of an equivalent circle diameter of 0.1 to 1 μm present down to a depth of 5 μm from the surface of the hardened nitrided layer, but the surface fatigue strength (maximum hertz stress) at the 10,000 million cycle ($10^7$ cycle) in a roller pitching fatigue strength is a high value of 3700 MPa or more. It could be confirmed that a good surface fatigue strength is obtained.

As opposed to this, in each of the comparative examples of Examples 41 to 62, where steels with chemical compositions outside the range of the present invention are soft nitrided, then induction hardened, the fatigue test lifetime was the value of the surface fatigue strength (maximum hertz stress) at a 10 million cycle ($10^7$ cycle) lifetime of less than 3700 MPa. Compared with the invention examples, it could be confirmed that the surface fatigue strength was inferior.

In the comparative example of Example 42, the amount of addition of B was over the upper limit of the present invention, while in the comparative example of Example 43, the amount of addition of N was over the upper limit, so each steel was remarkably brittle, cracks occurred during forging, and the steel could not be evaluated.

In each of the comparative examples of Examples 44 and 48, the Mn/S is low, concentration of S at the steel material surface cannot be prevented, and, for this reason, the thickness of the compound layer after soft nitriding is thin, the Vicker's hardness after 300° C. tempering is less than 650, and, as a result, the surface fatigue strength (maximum hertz stress) is low. Further, the thickness of the hardened nitrided layer of the steel part after induction hardening is a thin one of less than 0.4 mm, while the concentration of N down to a depth of 0.2 mm from the surface is also low.

The comparative example of Example 49 has a low Mn/S, so has a low thickness of the compound layer, and has a Vicker's hardness after 300° C. tempering of less than 650, so, as a result, it was confirmed, the surface fatigue strength (maximum hertz stress) is low.

Each of the comparative examples of Examples 51 to 54 has a chemical composition within the range of the present invention, but has a Vicker's hardness of less than 650 after 300° C. tempering and, as a result, it was confirmed, has a maximum hertz stress of less than 3000 MPa. This is because, in each of Examples 51 to 54, while the compound layer after soft nitriding has a sufficient thickness, in Example 51, the induction heating temperature is too high, so the N unnecessarily diffuses to the inside of the steel material, while the thickness of the hardened nitrided layer is a sufficient 0.65 mm, the Vicker's hardness after 300° C. tempering is 506, or less than 650, and, furthermore, an oxide layer is formed at the steel material surface, so the surface fatigue strength (maximum hertz stress) is lowered. Further, the concentration of N at a depth of 0.2 mm from the surface of the steel material is also a low 0.09%. In Example 53, the holding time (induction heating time) is too long, so the N unnecessarily diffuses to the inside of the steel material, while the thickness of the hardened nitrided layer is a sufficient 0.70 mm, the Vicker's hardness after 300° C. tempering is 540, or less than 650, and, as a result, the surface fatigue strength (maximum hertz stress) is low. Further, the concentration of N at a depth of 0.2 mm from the surface of the steel material is also a low 0.20%.

Each of the comparative examples of Examples 55 to 5 has a Vicker's hardness of less than 650 after 300° C. tempering and, as a result, it was confirmed the surface fatigue strength (maximum hertz stress) is less than 3000 MPa. This is because the compound layer after soft nitriding is thin, so the thickness of the hardened nitrided layer is also thin. For example, in Example 56, the chemical composition is within the range of the present invention, but the soft nitriding temperature is too low, so the compound layer is thin, the Vicker's hardness after 300° C. tempering is less than 650, and, as a result, the surface fatigue strength (maximum hertz stress) is low. Further, the thickness of the hardened nitrided layer is a thin 0.16 mm.

The comparative example of Example 57 has an amount of addition of Mn smaller than the range of the present invention, has an amount of addition of S greater than the range of the present invention, has an Mn/S smaller than the range of the present invention, and has too high a soft nitriding temperature, so the compound layer is thin, the Vicker's hardness after 300° C. tempering is 387, or less than 650, and, as a result, it was confirmed, the surface fatigue strength (maximum hertz stress) is low. Further, the thickness of the hardened nitrided layer is a thin 0.15 mm, while the concentration of N at a depth of 0.2 mm from the surface of the steel material is a low 0.08%.

Each of the comparative examples of Example 58 to 60 has a Vicker's hardness of less than 650 after 300° C. tempering and, as a result, has a low surface fatigue strength (maximum hertz stress). This is because each of Examples 58 to 60 has a thin compound layer and unsuitable induction heating conditions, so has a thin hardened nitrided layer. For example, Example 58 has an amount of addition of Mn lower than the range of the present invention and has an Mn/S smaller than the range of the present invention, so the compound layer is thin. Further, the induction heating temperature is high, so the Vicker's hardness after 300° C. tempering becomes 507, or less than 650, and, as a result, the surface fatigue strength (maximum hertz stress) is low. Further, the thickness of the hardened nitrided layer is a thin 0.14 mm, while the concentration of N at a depth of 0.2 mm from the surface of the steel material is a low 0.07%.

The comparative example of Example 62 has an Mn/S of 15 or lower than the range of the present invention and has a high soft nitriding temperature, so the compound layer is thin, and has a high induction heating temperature, so has a Vicker's hardness of less than 650 after 300° C. tempering, as a result of which the surface fatigue strength (maximum hertz stress) is an extremely low 2600 MPa. Further, the thickness of the hardened nitrided layer is a thin 0.23 mm, while the concentration of N at a depth of 0.2 mm from the surface of the steel material is a low 0.16%.

From the above, it could be confirmed that the invention examples, which are comprised of steel to which Si, Mn, and Al are added in suitable amounts and where Mn/S is made a suitable, range, which are soft nitriding, then are induction hardened, and which have surface hardenability of a Vicker's hardness of 650 or more when tempered at 300° C., exhibit a superior surface fatigue strength of a maximum hertz stress of 3700 MPa or more.

TABLE 1

| Example | Class | Chemical composition (mass %) | | | | | | | | |
|---|---|---|---|---|---|---|---|---|---|---|
| | | C | Si | Mn | P | S | Al | O | N | B |
| 1 | Inv. ex. | 0.32 | 0.61 | 0.66 | 0.014 | 0.006 | 0.120 | 0.002 | 0.0034 | 0.0004 |
| 1a | Inv. ex. | 0.55 | 0.19 | 0.81 | 0.020 | 0.008 | 0.030 | 0.001 | 0.0039 | 0.0001 |
| 1b | Inv. ex. | 0.53 | 0.19 | 0.79 | 0.025 | 0.010 | 0.022 | 0.002 | 0.0044 | 0.0002 |
| 2 | Inv. ex. | 0.37 | 0.59 | 1.15 | 0.022 | 0.008 | 0.035 | 0.001 | 0.0034 | 0.0005 |
| 3 | Inv. ex. | 0.49 | 0.45 | 1.16 | 0.009 | 0.009 | 0.069 | 0.004 | 0.0042 | 0.0010 |

TABLE 1-continued

| Example | Class | Chemical composition (mass %) | | | | | | | | |
|---|---|---|---|---|---|---|---|---|---|---|
| | | C | Si | Mn | P | S | Al | O | N | B |
| 4 | Inv. ex. | 0.51 | 1.20 | 1.40 | 0.025 | 0.016 | 0.153 | 0.002 | 0.0040 | 0.0006 |
| 5 | Inv. ex. | 0.54 | 0.25 | 0.80 | 0.019 | 0.007 | 0.126 | 0.003 | 0.0031 | 0.0015 |
| 6 | Inv. ex. | 0.55 | 0.85 | 0.96 | 0.012 | 0.010 | 0.159 | 0.001 | 0.0038 | 0.0023 |
| 7 | Inv. ex. | 0.55 | 1.32 | 1.23 | 0.021 | 0.014 | 0.080 | 0.002 | 0.0041 | 0.0004 |
| 8 | Inv. ex. | 0.59 | 0.85 | 0.72 | 0.021 | 0.006 | 0.099 | 0.004 | 0.0049 | 0.0038 |
| 9 | Inv. ex. | 0.54 | 1.30 | 0.85 | 0.017 | 0.009 | 0.025 | 0.002 | 0.0030 | 0.0004 |
| 10 | Inv. ex. | 0.46 | 0.85 | 0.79 | 0.023 | 0.009 | 0.021 | 0.003 | 0.0043 | 0.0009 |
| 11 | Inv. ex. | 0.44 | 0.69 | 1.07 | 0.015 | 0.010 | 0.192 | 0.001 | 0.0044 | 0.0008 |
| 12 | Inv. ex. | 0.41 | 1.41 | 1.44 | 0.014 | 0.011 | 0.102 | 0.001 | 0.0040 | 0.0017 |
| 13 | Inv. ex. | 0.51 | 0.79 | 0.85 | 0.022 | 0.012 | 0.110 | 0.001 | 0.0036 | 0.0005 |
| 14 | Inv. ex. | 0.55 | 0.34 | 1.12 | 0.015 | 0.008 | 0.099 | 0.001 | 0.0044 | 0.0009 |
| 15 | Inv. ex. | 0.45 | 0.91 | 0.67 | 0.020 | 0.009 | 0.089 | 0.001 | 0.0042 | 0.0006 |
| 16 | Inv. ex. | 0.45 | 0.75 | 1.29 | 0.021 | 0.018 | 0.021 | 0.003 | 0.0037 | 0.0005 |
| 17 | Inv. ex. | 0.35 | 0.40 | 0.50 | 0.020 | 0.005 | 0.089 | 0.004 | 0.0049 | 0.0005 |
| 18 | Inv. ex. | 0.46 | 0.54 | 0.71 | 0.020 | 0.007 | 0.021 | 0.002 | 0.0041 | 0.0005 |
| 19 | Inv. ex. | 0.45 | 1.41 | 0.53 | 0.010 | 0.007 | 0.087 | 0.005 | 0.0050 | 0.0021 |
| 20 | Inv. ex. | 0.51 | 0.29 | 0.85 | 0.023 | 0.007 | 0.045 | 0.004 | 0.0050 | 0.0005 |
| 21 | Inv. ex. | 0.50 | 1.67 | 0.56 | 0.021 | 0.004 | 0.089 | 0.004 | 0.0042 | 0.0004 |
| 22 | Inv. ex. | 0.49 | 0.55 | 0.83 | 0.013 | 0.010 | 0.310 | 0.004 | 0.0050 | 0.0029 |
| 23 | Inv. ex. | 0.48 | 1.00 | 1.20 | 0.024 | 0.010 | 0.110 | 0.004 | 0.0040 | 0.0008 |
| 24 | Inv. ex. | 0.45 | 0.89 | 1.32 | 0.011 | 0.011 | 0.109 | 0.002 | 0.0038 | 0.0010 |
| 25 | Inv. ex. | 0.40 | 0.25 | 0.55 | 0.010 | 0.005 | 0.082 | 0.001 | 0.0041 | 0.0006 |
| 26 | Inv. ex. | 0.45 | 1.43 | 0.69 | 0.011 | 0.009 | 0.096 | 0.001 | 0.0042 | 0.0015 |
| 27 | Inv. ex. | 0.48 | 0.59 | 1.00 | 0.020 | 0.009 | 0.085 | 0.002 | 0.0038 | 0.0029 |
| 28 | Inv. ex. | 0.51 | 1.00 | 0.85 | 0.018 | 0.007 | 0.101 | 0.003 | 0.0031 | 0.0006 |
| 29 | Inv. ex. | 0.55 | 1.56 | 0.75 | 0.013 | 0.008 | 0.123 | 0.002 | 0.0042 | 0.0005 |
| 30 | Inv. ex. | 0.56 | 1.90 | 0.84 | 0.020 | 0.006 | 0.030 | 0.003 | 0.0040 | 0.0005 |
| 31 | Inv. ex. | 0.43 | 0.25 | 0.43 | 0.017 | 0.003 | 0.193 | 0.003 | 0.0051 | 0.0033 |
| 32 | Inv. ex. | 0.50 | 0.95 | 0.75 | 0.020 | 0.005 | 0.102 | 0.003 | 0.0043 | 0.0006 |
| 33 | Inv. ex. | 0.48 | 0.72 | 1.02 | 0.013 | 0.007 | 0.110 | 0.003 | 0.0035 | 0.0010 |
| 34 | Inv. ex. | 0.41 | 0.81 | 0.75 | 0.013 | 0.009 | 0.099 | 0.002 | 0.0040 | 0.0004 |
| 35 | Inv. ex. | 0.45 | 0.31 | 0.83 | 0.020 | 0.011 | 0.123 | 0.001 | 0.0033 | 0.0004 |
| 36 | Inv. ex. | 0.53 | 0.51 | 1.01 | 0.011 | 0.013 | 0.025 | 0.002 | 0.0041 | 0.0009 |
| 37 | Inv. ex. | 0.57 | 0.46 | 1.07 | 0.015 | 0.015 | 0.243 | 0.002 | 0.0051 | 0.0022 |
| 38 | Inv. ex. | 0.50 | 0.66 | 1.13 | 0.010 | 0.011 | 0.034 | 0.002 | 0.0046 | 0.0007 |
| 39 | Inv. ex. | 0.45 | 1.01 | 0.83 | 0.018 | 0.010 | 0.025 | 0.003 | 0.0046 | 0.0010 |
| 40 | Inv. ex. | 0.42 | 0.26 | 0.58 | 0.016 | 0.006 | 0.027 | 0.002 | 0.0036 | 0.0004 |

TABLE 2

(Continuation of Table 1)

| Ex. | Class | Chemical composition (mass %) | | | | | | | | | | | | Mn/S |
|---|---|---|---|---|---|---|---|---|---|---|---|---|---|---|
| | | Cr | Mo | W | V | Nb | Ti | Ni | Cu | Ca | Mg | Zr | Te | |
| 1 | Inv. ex. | | | | | | | | | | | | | 116 |
| 1a | Inv. ex. | | | | | | | | | | | | | 101 |
| 1b | Inv. ex. | | | | | | | | | | | | | 79 |
| 2 | Inv. ex. | | | | | | | | | | | | | 142 |
| 3 | Inv. ex. | | | | | | | | | | | | | 126 |
| 4 | Inv. ex. | | | | | | | | | | | | | 90 |
| 5 | Inv. ex. | | | | | | | | | | | | | 108 |
| 6 | Inv. ex. | | | | | | | | | | | | | 94 |
| 7 | Inv. ex. | | | | | | | | | | | | | 91 |
| 8 | Inv. ex. | | | | | | | | | | | | | 126 |
| 9 | Inv. ex. | 0.75 | | | | | | | | | | | | 93 |
| 10 | Inv. ex. | | 0.28 | | | | | | | | | | | 90 |
| 11 | Inv. ex. | | | | 0.19 | 0.23 | | | | | | | | 112 |
| 12 | Inv. ex. | | | | | | 0.13 | | | | | | | 135 |
| 13 | Inv. ex. | 0.51 | | | 0.12 | | | | | | | | | 74 |
| 14 | Inv. ex. | 1.13 | | | | | 0.09 | | | | | | | 145 |
| 15 | Inv. ex. | 1.30 | | | 0.10 | | | | | | | | | 71 |
| 16 | Inv. ex. | 0.79 | 0.31 | | | | | | | | | | | 72 |
| 17 | Inv. ex. | 0.43 | | | 0.14 | 0.22 | 0.09 | | | | | | | 99 |
| 18 | Inv. ex. | 1.84 | 0.12 | 0.14 | 0.44 | | 0.10 | | | | | | | 105 |
| 19 | Inv. ex. | | | | | 0.02 | 0.11 | | | | | | | 77 |
| 20 | Inv. ex. | | | | 0.30 | | 0.10 | | | 0.0011 | | 0.0011 | | 121 |
| 21 | Inv. ex. | | 0.38 | | | 0.05 | | 0.48 | 0.11 | | 0.0044 | | | 148 |
| 22 | Inv. ex. | 1.63 | 0.69 | | 0.25 | 0.12 | 0.14 | | | | | | 0.009 | 82 |
| 23 | Inv. ex. | 0.79 | 0.35 | 0.11 | 0.13 | | | | | 0.0009 | 0.0008 | | | 122 |
| 24 | Inv. ex. | 0.78 | 0.09 | 0.11 | 0.15 | 0.06 | 0.07 | 0.24 | 0.08 | 0.0006 | 0.0006 | 0.0027 | 0.009 | 123 |
| 25 | Inv. ex. | | | | | | | | | | | | | 120 |

TABLE 2-continued (Continuation of Table 1)

| Ex. | Class | Chemical composition (mass %) | | | | | | | | | | | | Mn/S |
|---|---|---|---|---|---|---|---|---|---|---|---|---|---|---|
| | | Cr | Mo | W | V | Nb | Ti | Ni | Cu | Ca | Mg | Zr | Te | |
| 26 | Inv. ex. | | | | | | | | | | | | | 76 |
| 27 | Inv. ex. | | | | | | | | | | | | | 108 |
| 28 | Inv. ex. | | | | | | | | | | | | | 128 |
| 29 | Inv. ex. | | | | | | | | | | | | | 95 |
| 30 | Inv. ex. | | | | | | | | | | | | | 142 |
| 31 | Inv. ex. | 1.13 | | | | | | | | | | | | 132 |
| 32 | Inv. ex. | | | | | | 0.10 | | | | | | | 140 |
| 33 | Inv. ex. | 0.79 | | | | | 0.12 | | | | | | | 142 |
| 34 | Inv. ex. | 1.01 | | 0.07 | 0.11 | | | | | | | | | 80 |
| 35 | Inv. ex. | 0.52 | 0.01 | | 0.10 | | | | | | | | | 73 |
| 36 | Inv. ex. | 1.10 | 0.07 | 0.06 | 0.10 | | 0.02 | | | | | | | 76 |
| 37 | Inv. ex. | 0.61 | | | | | | 0.26 | 0.11 | | | | | 71 |
| 38 | Inv. ex. | 0.95 | 0.09 | 0.06 | 0.11 | | | 0.62 | 0.14 | | | | | 101 |
| 39 | Inv. ex. | 0.85 | 0.11 | | 0.12 | | 0.02 | 0.25 | 0.11 | | | | | 82 |
| 40 | Inv. ex. | 0.94 | 0.05 | 0.12 | 0.13 | 0.06 | 0.04 | 0.36 | 0.09 | 0.0005 | 0.0006 | 0.0026 | 0.010 | 91 |

TABLE 3

| | | | Soft nitriding | | Induction heating conditions | | After induction hardening | | | Surface fatigue strength (maximum hertz stress) (MPa) |
|---|---|---|---|---|---|---|---|---|---|---|
| | | | | | | | Hardened nitrided layer thickness (mm) | Tempering at 300° C. at depth of 0.2 mm | | |
| Ex. | Class | Machineability, no. of holes | Temp. (° C.) | Compound layer thickness (μm) | Temp. (° C.) | Time (s) | | Vicker's hardness | Hole density (holes/mm$^2$) | |
| 1 | Inv. ex. | >1000 | 552 | 28 | 897 | 1.6 | 0.40 | 691 | 7435 | 3700 |
| 1a | Inv. ex. | >1000 | 575 | 24 | 899 | 4.9 | 0.40 | 720 | 8352 | 3700 |
| 1b | Inv. ex. | >1000 | 575 | 26 | 898 | 4.9 | 0.41 | 709 | 7257 | 3700 |
| 2 | Inv. ex. | >1000 | 582 | 30 | 877 | 2.5 | 0.42 | 705 | 7432 | 3700 |
| 3 | Inv. ex. | >1000 | 566 | 23 | 837 | 4.2 | 0.42 | 718 | 6614 | 3700 |
| 4 | Inv. ex. | >1000 | 575 | 21 | 894 | 2.9 | 0.41 | 691 | 5457 | 3700 |
| 5 | Inv. ex. | >1000 | 583 | 24 | 881 | 4.9 | 0.40 | 764 | 6684 | 3700 |
| 6 | Inv. ex. | >1000 | 577 | 23 | 832 | 4.4 | 0.41 | 819 | 6357 | 3700 |
| 7 | Inv. ex. | >1000 | 590 | 19 | 854 | 4.9 | 0.40 | 675 | 8532 | 3700 |
| 8 | Inv. ex. | >1000 | 553 | 21 | 893 | 2.4 | 0.42 | 894 | 8533 | 3700 |
| 9 | Inv. ex. | >1000 | 598 | 27 | 898 | 0.9 | 0.41 | 689 | 7607 | 3750 |
| 10 | Inv. ex. | >1000 | 552 | 20 | 861 | 0.08 | 0.42 | 709 | 8381 | 3750 |
| 11 | Inv. ex. | >1000 | 587 | 25 | 859 | 3.2 | 0.42 | 757 | 7006 | 3800 |
| 12 | Inv. ex. | >1000 | 588 | 22 | 801 | 2.4 | 0.40 | 759 | 8725 | 3750 |
| 13 | Inv. ex. | >1000 | 575 | 20 | 890 | 1.8 | 0.42 | 679 | 5469 | 3750 |
| 14 | Inv. ex. | >1000 | 582 | 26 | 882 | 0.9 | 0.41 | 728 | 5453 | 3750 |
| 15 | Inv. ex. | >1000 | 591 | 28 | 892 | 0.5 | 0.40 | 704 | 5737 | 3750 |
| 16 | Inv. ex. | >1000 | 595 | 29 | 855 | 3.4 | 0.42 | 698 | 5133 | 3750 |
| 17 | Inv. ex. | >1000 | 570 | 22 | 885 | 2.2 | 0.42 | 746 | 8739 | 3800 |
| 18 | Inv. ex. | >1000 | 569 | 25 | 893 | 4.5 | 0.40 | 765 | 8153 | 3800 |
| 19 | Inv. ex. | >1000 | 590 | 24 | 882 | 4.4 | 0.41 | 805 | 7211 | 3750 |
| 20 | Inv. ex. | >1000 | 571 | 22 | 881 | 2.5 | 0.41 | 801 | 7724 | 3800 |
| 21 | Inv. ex. | >1000 | 580 | 31 | 872 | 4.5 | 0.42 | 693 | 7031 | 3750 |
| 22 | Inv. ex. | >1000 | 574 | 27 | 898 | 0.5 | 0.40 | 909 | 7759 | 3750 |
| 23 | Inv. ex. | >1000 | 571 | 24 | 895 | 0.8 | 0.41 | 715 | 7058 | 3750 |
| 24 | Inv. ex. | >1000 | 588 | 28 | 822 | 3.2 | 0.41 | 840 | 8906 | 3800 |
| 25 | Inv. ex. | >1000 | 589 | 25 | 882 | 1.2 | 0.40 | 831 | 20880 | 3800 |
| 26 | Inv. ex. | >1000 | 582 | 28 | 890 | 2.9 | 0.42 | 791 | 26862 | 3800 |
| 27 | Inv. ex. | >1000 | 593 | 27 | 899 | 2.4 | 0.41 | 909 | 19154 | 3800 |
| 28 | Inv. ex. | >1000 | 591 | 26 | 896 | 1.9 | 0.42 | 701 | 42901 | 3800 |
| 29 | Inv. ex. | >1000 | 581 | 25 | 894 | 2.4 | 0.42 | 690 | 21158 | 3800 |
| 30 | Inv. ex. | >1000 | 598 | 28 | 882 | 2.8 | 0.42 | 696 | 43255 | 3800 |
| 31 | Inv. ex. | >1000 | 583 | 33 | 893 | 1.2 | 0.41 | 994 | 11438 | 3800 |
| 32 | Inv. ex. | >1001 | 599 | 30 | 888 | 3.4 | 0.41 | 707 | 20960 | 3800 |
| 33 | Inv. ex. | >1002 | 587 | 29 | 884 | 1.2 | 0.42 | 744 | 17667 | 3800 |
| 34 | Inv. ex. | >1000 | 585 | 24 | 889 | 3.4 | 0.42 | 798 | 37155 | 3850 |
| 35 | Inv. ex. | >1000 | 596 | 26 | 893 | 1.3 | 0.41 | 678 | 29928 | 3850 |
| 36 | Inv. ex. | >1000 | 596 | 29 | 888 | 1.3 | 0.41 | 841 | 47635 | 3850 |
| 37 | Inv. ex. | >1000 | 581 | 23 | 882 | 3.1 | 0.42 | 809 | 34410 | 3800 |
| 38 | Inv. ex. | >1000 | 588 | 28 | 893 | 2.8 | 0.42 | 778 | 30449 | 3850 |

TABLE 3-continued

| | | | Soft nitriding | | Induction heating conditions | | After induction hardening | | | |
|---|---|---|---|---|---|---|---|---|---|---|
| | | | | | | | Hardened nitrided layer | Tempering at 300° C. at depth of 0.2 mm from surface, | Hole density | Surface fatigue strength |
| | | Machineability, | Compound layer | | | | | | | (maximum hertz |
| | | no. of | Temp. | thickness | Temp. | Time | thickness | Vicker's | (holes/ | stress) |
| Ex. | Class | holes | (° C.) | (μm) | (° C.) | (s) | (mm) | hardness | mm$^2$) | (MPa) |
| 39 | Inv. ex. | >1000 | 581 | 26 | 898 | 1.2 | 0.41 | 739 | 10752 | 3850 |
| 40 | Inv. ex. | >1000 | 596 | 27 | 895 | 2.1 | 0.41 | 790 | 47202 | 3850 |

TABLE 4

| | | Chemical composition (mass %) | | | | | | | | |
|---|---|---|---|---|---|---|---|---|---|---|
| Ex. | Class | C | Si | Mn | P | S | Al | O | N | B |
| 41 | Comp. ex. | 0.15 | 0.83 | 1.45 | 0.022 | 0.016 | 0.015 | 0.002 | 0.0090 | |
| 42 | Comp. ex. | 0.55 | 0.10 | 0.89 | 0.009 | 0.011 | 0.025 | 0.001 | 0.0052 | 0.0152 |
| 43 | Comp. ex. | 0.45 | 0.25 | 0.50 | 0.010 | 0.006 | 0.450 | 0.001 | 0.0160 | 0.0030 |
| 44 | Comp. ex. | 0.44 | 1.33 | 0.51 | 0.015 | 0.051 | 0.074 | 0.002 | 0.0090 | |
| 48 | Comp. ex. | 0.55 | 0.28 | 0.31 | 0.010 | 0.025 | 0.020 | 0.005 | 0.0047 | |
| 49 | Comp. ex. | 0.56 | 0.26 | 0.85 | 0.005 | 0.013 | 0.030 | 0.001 | 0.0056 | |
| 50 | Comp. ex. | 0.11 | 0.80 | 2.59 | 0.013 | 0.012 | 0.029 | 0.001 | 0.0110 | 0.0005 |
| 51 | Comp. ex. | 0.35 | 0.32 | 1.44 | 0.016 | 0.010 | 0.025 | 0.002 | 0.0053 | 0.0008 |
| 52 | Comp. ex. | 0.40 | 0.25 | 1.35 | 0.018 | 0.011 | 0.017 | 0.002 | 0.0052 | 0.0009 |
| 53 | Comp. ex. | 0.44 | 0.68 | 1.23 | 0.012 | 0.013 | 0.013 | 0.003 | 0.0047 | 0.0008 |
| 54 | Comp. ex. | 0.45 | 0.10 | 1.11 | 0.014 | 0.012 | 0.025 | 0.003 | 0.0051 | 0.0006 |
| 55 | Comp. ex. | 0.47 | 0.45 | 1.45 | 0.013 | 0.011 | 0.026 | 0.004 | 0.0047 | 0.0006 |
| 56 | Comp. ex. | 0.55 | 0.45 | 1.34 | 0.021 | 0.018 | 0.052 | 0.003 | 0.0050 | 0.0005 |
| 57 | Comp. ex. | 0.44 | 0.86 | 0.30 | 0.022 | 0.024 | 0.027 | 0.002 | 0.0047 | 0.0006 |
| 58 | Comp. ex. | 0.45 | 0.25 | 0.25 | 0.005 | 0.015 | 0.030 | 0.001 | 0.0050 | 0.0010 |
| 59 | Comp. ex. | 0.55 | 0.25 | 0.33 | 0.005 | 0.013 | 0.029 | 0.001 | 0.0047 | 0.0006 |
| 60 | Comp. ex. | 0.55 | 0.25 | 0.28 | 0.003 | 0.010 | 0.033 | 0.001 | 0.0053 | |
| 61 | Comp. ex. | 0.11 | 0.12 | 0.79 | 0.009 | 0.010 | 0.020 | 0.001 | 0.0090 | |
| 62 | Comp. ex. | 0.20 | 0.25 | 0.25 | 0.010 | 0.017 | 0.015 | 0.001 | 0.0047 | |

TABLE 5

(Continuation of Table 4)

| | | Chemical composition (mass %) | | | | | | | | | | | |
|---|---|---|---|---|---|---|---|---|---|---|---|---|---|
| Ex. | Class | Cr | Mo | W | V | Nb | Ti | Ni | Cu | Ca | Mg | Zr | Te | Mn/S |
| 41 | Comp. ex. | | | | | | | | | | | | | 91 |
| 42 | Comp. ex. | | | | | | | | | | | | | 81 |
| 43 | Comp. ex. | | | | | | | | | | | | | 83 |
| 44 | Comp. ex. | 0.51 | 1.43 | | | | | | | | | | | 10 |
| 48 | Comp. ex. | 0.60 | 0.11 | | 0.37 | | | | | | | | | 12 |
| 49 | Comp. ex. | 0.49 | 0.59 | | 0.51 | | 0.0018 | | | | | | | 65 |
| 50 | Comp. ex. | | | | | | | | | | | | 0.050 | 216 |
| 51 | Comp. ex. | | | | | | | | | | | | | 144 |
| 52 | Comp. ex. | 1.89 | 0.41 | | | | | | | | | | | 123 |
| 53 | Comp. ex. | 0.91 | | | | | | | | | | | | 95 |
| 54 | Comp. ex. | | 0.48 | 0.07 | 0.31 | | | | | | | | | 93 |
| 55 | Comp. ex. | 1.34 | | | 0.22 | | | | | | | 0.0020 | | 132 |
| 56 | Comp. ex. | | | | 0.15 | | | | | | | | | 105 |
| 57 | Comp. ex. | 0.54 | 0.09 | | 0.30 | | 0.10 | | | | | | | 13 |
| 58 | Comp. ex. | | | | 0.50 | 0.0016 | | | | | | | | 17 |
| 59 | Comp. ex. | | | | 0.49 | 0.0017 | | | | | | | | 25 |
| 60 | Comp. ex. | | | | | | | | | | | | | 28 |
| 61 | Comp. ex. | 0.30 | | | | | | | | | | | | 79 |
| 62 | Comp. ex. | 0.90 | | | 0.50 | | 0.50 | | | | | | | 15 |

TABLE 6

| | | Soft nitriding | | Induction heating conditions | | After induction hardening | | | Surface fatigue strength |
| | | | | | | Hardened nitrided layer | Tempering at 300° C. at depth of 0.2 mm | | |
| Ex. | Class | Machineability, no. of holes | Temp. (° C.) | Compound layer thickness (μm) | Temp. (° C.) | Time (s) | thickness (mm) | from surface, Vicker's hardness | Hole density (holes/mm²) | (maximum hertz stress) (MPa) |
|---|---|---|---|---|---|---|---|---|---|---|
| 41 | Comp. ex. | 81 | 593 | 15 | 876 | 1.4 | 0.33 | 595 | 3312 | 2900 |
| 42 | Comp. ex. | — | — | — | — | — | — | — | — | — |
| 43 | Comp. ex. | — | — | — | — | — | — | — | — | — |
| 44 | Comp. ex. | 189 | 590 | 2 | 850 | 3.2 | 0.13 | 465 | 4934 | 2600 |
| 48 | Comp. ex. | 65 | 559 | 4 | 884 | 5.0 | 0.29 | 570 | 2754 | 2800 |
| 49 | Comp. ex. | 66 | 585 | 1 | 879 | 3.2 | 0.09 | 467 | 2038 | 2300 |
| 50 | Comp. ex. | 45 | 587 | 12 | 880 | 4.7 | 0.65 | 575 | 4271 | 2900 |
| 51 | Comp. ex. | >1000 | 590 | 24 | 980 | 4.0 | 0.65 | 506 | 2394 | 2700 |
| 52 | Comp. ex. | >1000 | 595 | 25 | 700 | 3.5 | 0.20 | 398 | 2816 | 2150 |
| 53 | Comp. ex. | >1000 | 577 | 20 | 890 | 8.0 | 0.70 | 540 | 1865 | 2900 |
| 54 | Comp. ex. | >1000 | 580 | 21 | 845 | 0.03 | 0.07 | 425 | 880 | 2600 |
| 55 | Comp. ex. | >1000 | 680 | 5 | 837 | 4.9 | 0.10 | 401 | 3082 | 2600 |
| 56 | Comp. ex. | >1000 | 490 | 4 | 880 | 3.0 | 0.16 | 551 | 1155 | 2700 |
| 57 | Comp. ex. | >1000 | 700 | 3 | 886 | 2.1 | 0.15 | 387 | 4670 | 2500 |
| 58 | Comp. ex. | >1000 | 570 | 2 | 910 | 2.5 | 0.14 | 507 | 575 | 2600 |
| 59 | Comp. ex. | >1000 | 570 | 3 | 690 | 1.2 | 0.10 | 401 | 4366 | 2200 |
| 60 | Comp. ex. | 33 | 570 | 3 | 920 | 4.2 | 0.12 | 565 | 2865 | 2700 |
| 61 | Comp. ex. | 89 | 590 | 10 | 1000 | 4.0 | 0.32 | 572 | 3482 | 2800 |
| 62 | Comp. ex. | 45 | 650 | 4 | 1000 | 2.0 | 0.23 | 518 | 1293 | 2600 |

TABLE 7

| Machining conditions | Drill | Others |
|---|---|---|
| Machining speed: 65 m/min<br>Feed: 0.17 mm/rev<br>Lubrication: Mist lubrication (MQL) | Size: φ5 mm × length 168 mm<br>Material: Ceramic coating Cemented carbide<br>Projecting amount: 105 mm | Opening depth: 90 mm<br>Judgment of life: Total number of holes until drill breaks (cut off at 1000) |

Note that, what is explained above only illustrates embodiments of the present invention. The present invention can be changed in various ways within the scope of the language of the claims.

INDUSTRIAL APPLICABILITY

As explained above, by soft nitriding, then induction hardening, the steel for surface hardening for machine structural use of the present invention is remarkably increased in hardness at the surface of the steel material and is increased in softening resistance to thereby give a high surface fatigue strength. The present invention is high in value of use in industry.

Further, the parts for machine structural use of the present invention can be used for power transmission parts of automobiles etc. for which a high surface fatigue strength is demanded not only at ordinary temperature of course, but also under usage conditions of resulting in a high temperature of around 300° C., for example, gears, continuously variable transmissions, bearings, constant velocity joints, hubs, etc. They greatly contribute to the higher output and lower cost of automobiles etc. and have remarkable advantageous effects in industry.

REFERENCE SIGNS LIST

1: cross-sectional hardness distribution of steel material as soft nitrided
2: cross-sectional hardness distribution of steel material which is soft nitrided, then induction hardened
10: hardened nitrided layer
20: hole
30: porous layer
40: surfacemost layer

The invention claimed is:

1. A steel part for machine structural use, said steel part being nitrided, then induction hardened at less than 900° C. and tempered at 300° C.,
wherein the steel part has a steel composition that comprises, in mass %,
C: 0.3 to 0.6%,
Si: 0.02 to 2.0%,
Mn: 0.35 to less than 1.5%, and
Al: 0.01 to 0.5%,
is restricted to
B: less than 0.0002%,
S: 0.0001 to 0.021%,
N: 0.003 to 0.0055%,
P: 0.0001 to 0.03%, and
O: 0.0001 to 0.0050%, and
one or more of
W: 0.0025 to 0.5%,
Cr: 0.2 to 2.0%,
Mo: 0.05 to 1.0%,
V: 0.05 to 1.0%,
Nb: 0.005 to 0.3%,
Ti: 0.005 to 0.2%,
Ni: 0.05 to 2.0%,
Cu: 0.01 to 2.0%,
Ca: 0.0005 to 0.01%,
Mg: 0.0005 to 0.01%,
Zr: 0.0005 to 0.05%,
Te: 0.0005 to 0.1%, and
a balance of Fe and unavoidable impurities,
wherein a ratio Mn/S is 70 to 30,000, and
said steel part has a core of non-nitrided steel and a hardened nitrided layer on a surface of the steel part, wherein said steel part has holes having an equivalent circle diameter of 0.1 to 1 μm down to a depth of at least 5 μm from a surface of said hardened nitrided layer present on a scale of 5,133 to 47,635/mm²; and
wherein the hardened nitrided layer has a Vicker's hardness of 650 or more and a thickness of 0.2 mm or more at its surface.

* * * * *

UNITED STATES PATENT AND TRADEMARK OFFICE
CERTIFICATE OF CORRECTION

PATENT NO. : 9,777,343 B2  
APPLICATION NO. : 14/252093  
DATED : October 3, 2017  
INVENTOR(S) : Atsushi Mizuno et al.

Page 1 of 1

It is certified that error appears in the above-identified patent and that said Letters Patent is hereby corrected as shown below:

On the Title Page

Please insert the following:
-- (62) Related U.S. Application Data
Division of application No. 13/138,174, filed as application No. PCT/JP2010/050742 on Jan. 15, 2010, now Pat. No. 8,802,005. --

Signed and Sealed this
Fifteenth Day of May, 2018

Andrei Iancu
*Director of the United States Patent and Trademark Office*